United States Patent
Jia et al.

(10) Patent No.: US 12,524,620 B2
(45) Date of Patent: Jan. 13, 2026

(54) CONTENT GENERATION FOR GENERATIVE LANGUAGE MODELS

(71) Applicant: Microsoft Technology Licensing, LLC, Redmond, WA (US)

(72) Inventors: Yu Jia, Kirkland, WA (US); Kevin M. Chuang, San Francisco, CA (US); Dixon Lo, San Francisco, CA (US); Praveen Kumar Bodigutla, San Jose, CA (US); Sandeep Kumar Jha, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/345,905

(22) Filed: Jun. 30, 2023

(65) Prior Publication Data
US 2024/0296178 A1    Sep. 5, 2024

Related U.S. Application Data

(60) Provisional application No. 63/487,781, filed on Mar. 1, 2023, provisional application No. 63/487,798, filed on Mar. 1, 2023.

(51) Int. Cl.
| | |
|---|---|
| G06F 16/00 | (2019.01) |
| G06F 16/3329 | (2025.01) |
| G06F 40/20 | (2020.01) |
| G06F 40/35 | (2020.01) |
| H04L 51/52 | (2022.01) |

(52) U.S. Cl.
CPC .......... *G06F 40/35* (2020.01); *G06F 16/3329* (2019.01); *G06F 40/20* (2020.01); *H04L 51/52* (2022.05)

(58) Field of Classification Search
CPC .................................................. G06F 16/3329
See application file for complete search history.

(56) References Cited

U.S. PATENT DOCUMENTS

| | | |
|---|---|---|
| 11,314,945 B1 | 4/2022 | Nguyen |
| 11,516,158 B1 | 11/2022 | Luzhnica |

(Continued)

OTHER PUBLICATIONS

International Search Report and Written Opinion received for PCT Application No. PCT/US2024/018245, Jun. 17, 2024, 13 pages.

(Continued)

*Primary Examiner* — Khanh B Pham
(74) *Attorney, Agent, or Firm* — Nicholson De Vos Webster & Elliott LLP

(57) ABSTRACT

Methods, systems, and apparatuses include receiving input from a client device providing a graphical user interface (GUI) associated with a profile and a profile interface. Attribute data is extracted from the profile in response to receiving the input. An identifier is determined for the profile based on the attribute data. A set of attributes of the attribute data is mapped to a set of prompt inputs based on the identifier. A prompt is created using the set of prompt inputs. A generative language model is applied to the prompt. A suggestion for adding content to the profile is output by the generative language model based on the prompt. The suggestion is sent to the client device for presentation via the profile interface.

20 Claims, 20 Drawing Sheets

(56) References Cited

U.S. PATENT DOCUMENTS

| | | | |
|---|---|---|---|
| 2008/0046976 A1* | 2/2008 | Zuckerberg | H04L 63/102 726/4 |
| 2012/0144280 A1* | 6/2012 | Deng | G06F 40/106 715/202 |
| 2014/0136933 A1 | 5/2014 | Berger et al. | |
| 2016/0103564 A1 | 4/2016 | Chao | |
| 2018/0213057 A1* | 7/2018 | Wang | H04L 67/306 |
| 2018/0239770 A1 | 8/2018 | Ghotbi et al. | |
| 2019/0122162 A1* | 4/2019 | Abhinav | G06Q 10/063118 |
| 2021/0201144 A1 | 7/2021 | Jonnalagadda et al. | |
| 2022/0045975 A1 | 2/2022 | Flöther et al. | |
| 2022/0060438 A1 | 2/2022 | Prasad | |
| 2022/0124055 A1 | 4/2022 | Sharifi | |
| 2022/0244847 A1 | 8/2022 | Margot | |
| 2022/0318488 A1* | 10/2022 | Ray | G06N 3/045 |
| 2022/0383153 A1* | 12/2022 | Mahmoud | G06N 5/02 |
| 2023/0196003 A1 | 6/2023 | Barak | |
| 2023/0259692 A1* | 8/2023 | Wright | G06F 40/56 704/9 |
| 2023/0306049 A1 | 9/2023 | Shah | |
| 2024/0086648 A1 | 3/2024 | Han | |
| 2024/0267344 A1 | 8/2024 | Mulligan | |
| 2024/0296293 A1 | 9/2024 | Tsun | |
| 2024/0406124 A1 | 12/2024 | Cunningham | |
| 2025/0231981 A1 | 7/2025 | Kearns | |

OTHER PUBLICATIONS

International Search Report and Written Opinion received for PCT Application No. PCT/US2024/018247, Jun. 20, 2024, 14 pages.
U.S. Appl. No. 18/345,879, filed Jun. 30, 2023.
Non-Final Office Action mailed on Dec. 10, 2024, in U.S. Appl. No. 18/345,879, 12 pages.
Final Office Action mailed on Jun. 18, 2025, in U.S. Appl. No. 18/345,879 14 Pages.
Notice of Allowance mailed on Oct. 21, 2025, in U.S. Appl. No. 18/345,879 09 pages.

* cited by examiner

Research shows that walking in nature offers stress-busting and mood-boosting advantages, plus a welcome chance to stretch our legs.

1,285 • 234 comments

Show all activity →

About

I strongly believe that in order to achieve optimal health and
including our physical, mental, and emotional wellbeing. I am
that you can live your best life!

All done!
Nest time you update your profile, use Optimize to see new suggestions. This tool works best with after new profile updates.

Close

Experience

CompanyName1
Full-Time  4 yrs 8 mos
City1, State1

- JobTitle1
  Jun 2017 - Mar 2021  3 yrs 9 mos
  I work with employees to conduct baseline health assessments to help manage stress, sleep, and enact other sustainable, and positive behavorial lifestyle changes.

- JobTitle2
  May 2015 - Jun 2017  2 yrs 1 mo
  Using a broad knowledge of health and wellness techniques, I empower my clients to become experts over their own body and mind. Together we identify challenges and blind spots that are...see more Rest Better with Light Exercise CompanyName2
Full-Time  5 yrs 8 mos
City2, State2

- JobTitle3
  Aug 2011 - Jan 2015  3 yrs 5 mos

- JobTitle4
  May 2009 - Aug 2011  2 yrs 3 mos

CompanyName3

FIG. 8

CONTENT GENERATION FOR GENERATIVE LANGUAGE MODELS

CROSS-REFERENCE TO RELATED APPLICATIONS

The present application claims the benefit under 35 U.S.C. § 119(e) of U.S. Provisional Patent Application Ser. No. 63/487,781 filed Mar. 1, 2023 and U.S. Provisional Patent Application Ser. No. 63/487,798 filed Mar. 1, 2023, each of which is incorporated herein by this reference in its entirety.

TECHNICAL FIELD

The present disclosure generally relates to machine learning models, and more specifically, relates to content generation for machine learning models.

BACKGROUND ART

Machine learning is a category of artificial intelligence. In machine learning, a model is defined by a machine learning algorithm. A machine learning algorithm is a mathematical and/or logical expression of a relationship between inputs to and outputs of the machine learning model. The model is trained by applying the machine learning algorithm to input data. A trained model can be applied to new instances of input data to generate model output. Machine learning model output can include a prediction, a score, or an inference, in response to a new instance of input data. Application systems can use the output of trained machine learning models to determine downstream execution decisions, such as decisions regarding various user interface functionality.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 8 illustrates another example graphical user interface in accordance with some embodiments of the present disclosure.

DETAILED DESCRIPTION

Figure 1:
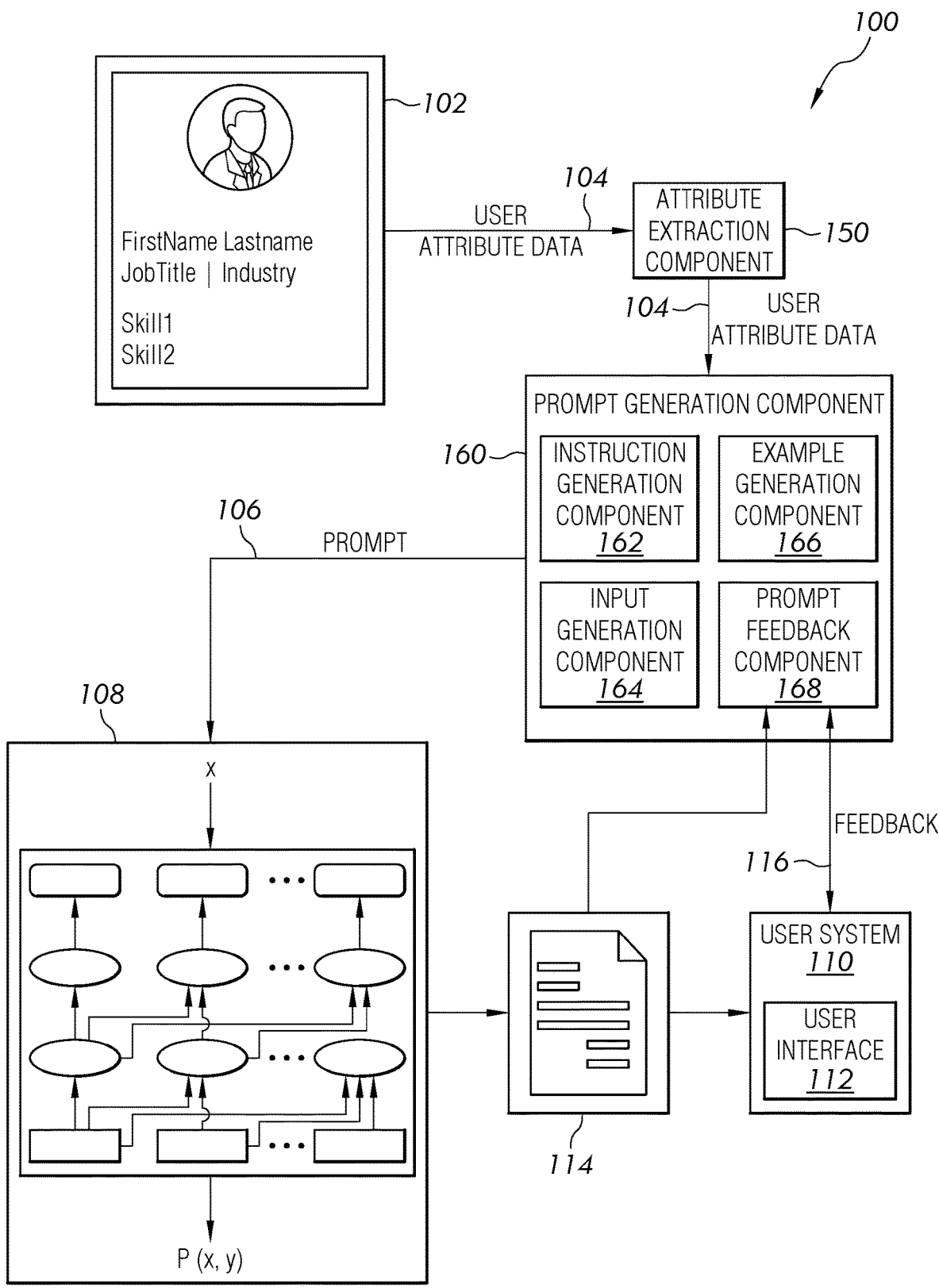
FIG. 1 illustrates an example content generation system for generative language models that includes an attribute extraction component and a prompt generation component in accordance with some embodiments of the present disclosure.

A generative model uses artificial intelligence technology to machine-generate new digital content based on model inputs and the data with which the model has been trained. Whereas discriminative models are based on conditional probabilities P (y|x), that is, the probability of an output y given an input x (e.g., is this a photo of a dog?), generative models capture joint probabilities P(x, y), that is, the likelihood of x and y occurring together (e.g., given this photo of a dog and an unknown person, what is the likelihood that the person is the dog's owner, Sam?).

A generative language model generates new text in response to model input. The model input includes a task description, also referred to as a prompt. The task description can include an instruction and/or an example of digital content. A task description can be in the form of natural language text, such as a question or a statement, and can include non-text forms of content, such as digital imagery and digital audio. Given a task description, a generative model can generate a set of task description-output pairs, where each pair contains a different output, and assign a score to each of the generated task-description-output pairs. The output in a given task description-output pair contains text that is generated by the model rather than provided to the model as an input.

The score associated by the model with a given task description-output pair represents a probabilistic or statistical likelihood of there being a relationship between the output and the corresponding task description in the task description-output pair. For example, given an image of an animal and an unknown person, a generative model could generate the following task description-output pairs and associated scores: [what is this a picture of?; this is a picture of a dog playing with a young boy near a lake; 0.9], [what is this a picture of?; this is a picture of a dog walking with an old woman on a beach; 0.1]. The higher score of 0.9 indicates a higher likelihood that the picture shows a dog playing with a young boy near a lake rather than a dog walking with an old woman on a beach. The score for a given task description-output pair is dependent upon the way the generative model has been trained and the data used to perform the model training. The generative model can sort the task description-output pairs by score and output only the pair or pairs with the top k scores, where k is a positive integer. For example, the model could discard the lower-scoring pairs and only output the top-scoring pair as its final output.

Machine learning models have many potential uses. However, there are shortcomings that present technical challenges to the widespread use of machine learning models for generating new content at scale. For example, machine learning models for generating new content require human intervention both to ensure that model output does not diverge from a given task description and to prevent the model from generating output that is too similar to the task description or previous outputs. Similarly, machine learning models rely heavily on human intervention to generate the task description for content generation.

Additionally, some machine learning models have limits on the length or size of the inputs (e.g., data included in the task description) that the models can receive or otherwise constrain the input parameter values. These limits can impact the quality of the model output, particularly if the task description is not well-designed. Quality as used herein may refer to an objective determination such as a machine-determined difference between an expected model output and an actual model output, which also may be referred to as loss. In conventional systems, determining what constitutes a well-designed task description is a trial-and-error process involving a human formulating task descriptions, observing model outputs, and modifying the task descriptions based on the model outputs. Further, training a machine learning model is a resource intensive process that involves time-consuming human experimentation to generate training data and requires subject matter expertise to configure the model architecture and hyperparameters to produce reliable output for real world tasks.

The shortcomings of machine learning models are particularly acute when the models are tasked with generating conversational text. These conventional models fail to generate conversational text with tones similar to natural human conversational patterns or rely heavily on pre-publication and post-publication editing by human reviewers. In particular, conventional models struggle to generate conversational text with varying semantic and syntactical structures expected of a human writer. This shortcoming is due, in part, to the generalized nature of the data used to train the models. For example, conventional models are not trained on domain specific data and/or data that is relevant in conversations within specific domains. Conventional machine learning models fail to generate documents with these differing tones, semantics and syntaxes in domain specific environments.

A content generation system for generative language models as described herein includes a number of different components that alone or in combination address the above and other shortcomings of the conventional machine learning model technologies, particularly when applied to the machine generation of domain specific data, such as professional summaries and conversations. For example, by utilizing domain specific data, the content generation system can generate documents and conversations with tones, semantics and syntaxes that are applicable for the desired domain. For example, the content generation system can leverage attribute data to generate professional conversations between coworkers or between a prospective employee and a prospective employer which have different tones, semantics, and syntax than casual conversations between friends. Additionally, the content generation system can leverage the attribute data that indicates the strength of connections between users when generating conversations since tones, semantics, and syntax can also differ depending on the type of relationship of those within the conversation. For example, the content generation system can generate a conversation with a more casual tone for peers within a company but generates a conversation with a more professional tone for a conversation between a potential employee and potential employer, which is indicated by the attribute data. As described in more detail below, the content generation system described includes an instruction generation subsystem, an example generation subsystem, an input generation subsystem, and a prompt feedback subsystem.

FIG. 1 illustrates an example of a content generation system for generating content for a user interface using attribute data in accordance with some embodiments of the present disclosure.

In the example of FIG. 1, a content generation system 100 for generative language models includes an attribute extraction component 150, a prompt generation component 160, and deep learning model 108. The attribute extraction component 150 interfaces with one or more components of an application software system (such as application software system 230 of FIG. 2) that create, edit, and store entity profiles, network activity data, and related data such as rankings, scores, and labels. For example, in FIG. 1, a profile 102 has been created and stored by an online system, such as a professional social network system or another type of application software system. Profile 102 contains attribute data 104 including descriptors of the skills and capabilities of the user associated with profile 102. These descriptors include, in the example of FIG. 1, a job title, an industry, professional experience, education, certifications, and skills, e.g., {Skill1, Skill2}. In some embodiments, the various attribute data and the network activity data is unique to the social network system such that the content generation system 100 that is in communication with the social network system is uniquely positioned and uniquely capable of generating digital content that is highly relevant, personalized, and effective for the users of the social network system.

In some embodiments, although illustrated separately, part or all of attribute extraction component 150, prompt generation component 160, and/or deep learning model 108 are implemented on user system 110. For example, user system 110 can include deep learning model 108 and prompt generation component 160 can send prompt 106 to user system 110 implementing deep learning model 108, causing suggestion 114 to be displayed on a graphical user interface (GUI) of user system 110. Further details with regards to attribute extraction component 150, prompt generation component 160, deep learning model 108, and user system 110 are described below.

Descriptor as used herein may refer to a piece of digital data, such as a word, phrase, feature, digital image, digital audio, digital video, or graphic, that can be used to describe or identify an entity or an activity. In some embodiments, descriptors include one or more of: a job title, an industry, skills, experience, certifications, publications, honors, education, and similar descriptors. Entity as used herein may refer to a user of an online system or another type of entity, such as a company or organization, a content item, or an attribute. For example, in a social networking application, entities can include a page with which a user of the online system can interact. For example, an entity could be a profile, a profile for a group of people, an organization profile, a job posting, etc. Activity as used herein may refer to network activity, such as digital communications between computing devices and systems. Examples of network activity include initiating a session with an online system by, e.g., logging in to an application, initiating a page load to load a web page into a browser, uploading, downloading, creating, and sharing digital content items on the network, and executing social actions, such as sending messages and/or adding comments or social reactions to articles or posts on the network.

In some embodiments, profile 102 is a profile for a user of user system 110. In other embodiments, profile 102 is a profile of a user (or another user) with similar and/or relevant attribute data to the profile for the user of user system 110. Attribute extraction component 150 receives attribute data from a user profile associated with the user of user system 110 and determines profile 102 based on similarities between the attribute data of the user profile and attribute data 104 of profile 102. For example, attribute extraction component 150 determines that a user profile does include sufficient attribute data for content generation and uses a user attribute of the attribute data (e.g., experience or job title) to find profile 102 that shares the same user attribute. Attribute extraction component 150 extracts attribute data 104 from the found profile 102 to generate content for the user of user system 110. In some embodiments, respective attribute data may be associated with different tiers of entities, such as an individual member, a group of members, an organization, and the like. In some embodiments, profile 102 is a profile for an organization or group. For example, profile 102 is a profile for a company.

Figure 2:
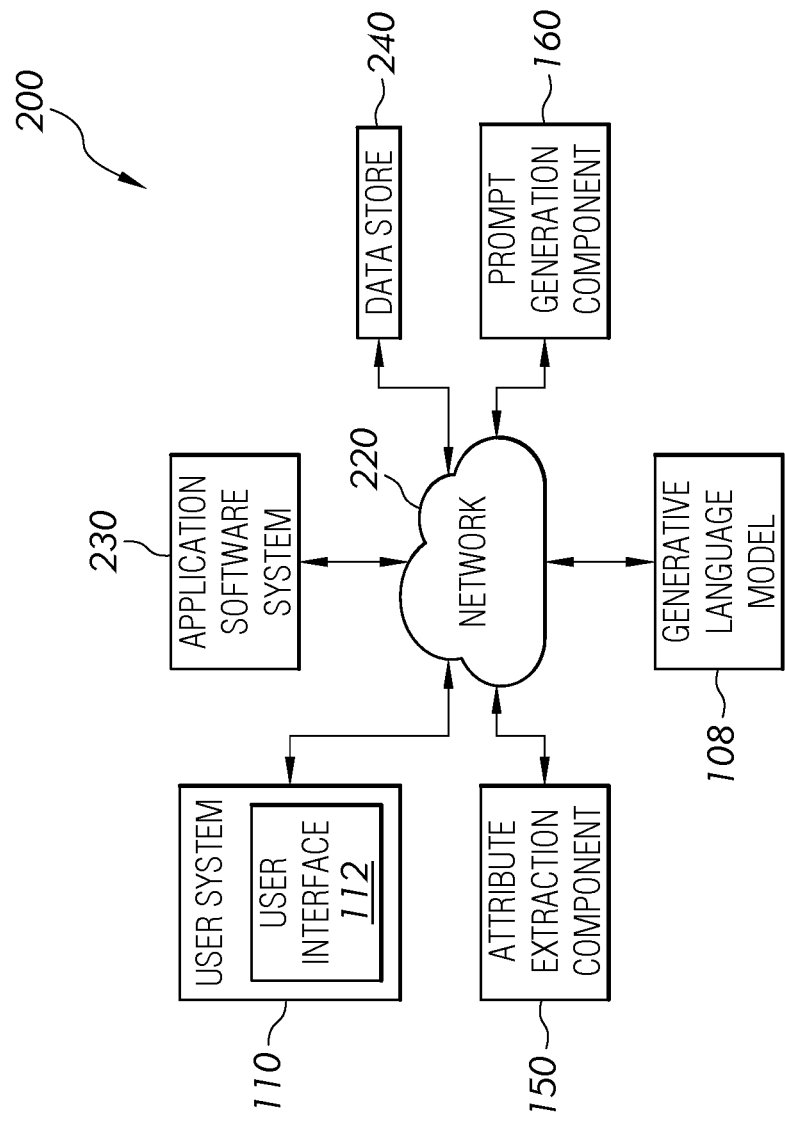
FIG. 2 illustrates another example computing system that includes an attribute extraction component and a prompt generation component in accordance with some embodiments of the present disclosure.

Attribute extraction component 150 extracts attribute data 104 from the online system by, for example, executing one or more queries on one or more data stores of the online system (such as data store 240 of FIG. 2). In some embodiments, attribute extraction component 150 extracts attribute data 104 from the online system in response to a user input received by an application software system. For example, an application software system (such as application software system 230 of FIG. 2) receives a user input from user system 110 as described in further detail with reference to FIG. 4 and/or FIG. 10. The application software system then executes one or more queries on one or more data stores or causes attribute extraction component 150 to execute the one or more queries on the one or more data stores. In response to the execution of the one or more queries, attribute extraction component 150 extracts attribute data 104 from the one or more data stores associated with profile 102. Attribute data 104 includes data that is specific to a user or a user group of the online system. For example, the attribute data 104 are descriptors specific to profile 102 (e.g., a job title, an industry, skills, experience, certifications, publications, honors, education, and similar descriptors). Attribute extraction component 150 sends extracted attribute data 104 to prompt generation component 160.

In some embodiments, attribute data 104 includes brand data associated with profile 102 input by a user of profile 102 and stored for future user (e.g., stored in data store 240). This information is not necessarily publicly available and may be input by the user into an interface that is not publicly available on profile 102. In some embodiments, this data can include a tone to use in communication (e.g., a tone 342 to use in prompt generation for messages initiated by profile 102). In some embodiments, this data can include product and/or service information to include to use in communications such as messages initiated by profile 102. For example, a user of a profile for a specific product can input details about their brand, products and/or service, and a desired tone. When initiating electronic messaging from this profile in the future, these details are available as attributes extracted from the profile and used in prompt generation.

Prompt generation component 160 receives attribute data 104 and creates prompt 106 using the attribute data 104. As shown in FIG. 1, prompt generation component 160 can include an instruction generation component 162, an input generation component 164, an example generation component 166, and a prompt feedback component 168. Combinations of one or more of these components can be used in creating prompt 106. For example, input generation component 164 of prompt generation component 160 may generate prompt inputs using attribute data 104. In some embodiments, prompt generation component 160 uses these prompt inputs and a set of instructions to create prompt 106. In some embodiments, the set of instructions is generated by instruction generation component 162. In other embodiments, the set of instructions is prestored and extracted from a data store (such as data store 240 of FIG. 2). In still other embodiments, an initial set of instructions is prestored and extracted from the data store and instruction generation component 162 uses the initial set of instructions to generate the set of instructions used for creating prompt 106. For example, instruction generation component 162 uses the initial set of instructions and the attribute data 104 to generate the set of instructions used for creating prompt 106. The term set of instructions as used in this disclosure can be a single instruction or multiple instructions. In some embodiments, the instructions are text instructions instructing deep learning model 108 to generate content. For example, the instructions are "Create a profile summary for a [JobTitle1] with [Experience]." In another example, the instructions are "Create a message to [JobPoster] for [JobApplicant] applying to [JobPosition] based on [Experience] and [Education]." In such examples, the bracketed phrases are used as placeholders for user attributes of attribute data 104. Instructions can also include further instructions indicating that deep learning model 108 should use certain attributes of attribute data 104 and/or examples for generating content.

In some embodiments, prompt generation component 160 determines an identifier for profile 102 using attribute data 104. For example, attribute data 104 includes descriptors indicating that the user associated with profile 102 has two years' experience in an industry. Prompt generation component 160 assigns an identifier of entry level to profile 102 based on the experience attribute of attribute data 104. In such an example, the identifier indicates the experience level of profile 102. In some embodiments, determining the identifier as entry level is based on a number of years of professional experience in a field (e.g., less than five years). In other embodiments, determining the identifier as entry level is based on the job title for an industry.

In some embodiments, prompt generation component 160 determines an intent for content generation by profile 102. For example, in response to receiving an input from a user of user system 110 to initiate electronic messaging with a profile, prompt generation component 160 can determine a goal or purpose for that electronic messaging. In some embodiments, prompt generation component 160 determines messaging intent options and presents them to a user of user system 110. For example, prompt generation component 160 can use predetermined messaging intent options such as "Seek work" and "Introduce myself" and present these options to a user of user system 110. Prompt generation component 160 determines the messaging intent based on a user selection of one of the intent options. Further details with regard to messaging intent are explained with reference to FIG. 16.

In some embodiments, prompt generation component 160 determines a connection between the participants of the electronic messaging. For example, attribute extraction component 150 extracts attribute data 104 from profile 102 (the profile for the user of user system 110 initiating the electronic messaging) and for a second profile associated with the recipient of the electronic messaging. Prompt generation component 160 can then determine whether the profiles have similar job positions, similar schools, similar companies, similar skills, similar locations, follow similar profiles, belong to similar groups, have made posts about a similar topic, etc. In some embodiments, prompt generation component 160 determines the connection by ranking these similarities. For example, prompt generation component 160 uses a ranking machine learning algorithm to rank the similarities of the profiles based on shared attributes. In such an embodiment, for example, a shared school may be ranked higher than similar skills.

In some embodiments, prompt generation component 160 determines the messaging intent based on the connection between the participants of the electronic messaging. For example, the connection may indicate that the user initiating the electronic messaging has recently applied to a job which was posted by the recipient of the electronic messaging. In such an example, prompt generation component 160 determines that the messaging intent is to seek work. In an alternate example, the connection may indicate that the user initiating the electronic messaging is a start-up founder and that the recipient of the electronic messaging is an investor. In such an example, prompt generation component 160 determines that the messaging intent is to seek funding.

In some embodiments, prompt generation component 160 determines the messaging intent based on historical activity data of the user of user system 110. For example, prompt generation component 160 determines that the messaging intent is to seek work if the user of user system 110 has recently applied to one or more jobs.

In some embodiments, prompt generation component 160 maps a set of user attributes to a set of prompt inputs using the identifier. For example, prompt generation component 160 maps user attributes that are relevant and effective to display for a user with entry level experience (e.g., education) while excluding user attributes that are irrelevant and ineffective to display for a user with entry level experience (e.g., years of experience). The set of user attributes that are mapped can include one or more user attributes of attribute data 104 and in some embodiments, include all of attribute data 104. The term set of user attributes as used in this disclosure can be a single user attribute or multiple user attributes. Further details with regard to prompt generation are described with reference to FIG. 3.

In some embodiments, prompt generation component 160 maps a set of user attributes to a set of prompt inputs using the connection. For example, prompt generation component 160 maps user attributes that are relevant based on the ranking of the connection between the user initiating the electronic messaging and the recipient of the electronic messaging. In some embodiments, prompt generation component 160 maps a shared attribute (e.g., college attended) of attribute data 104 to a prompt input of prompt 106 based on the connection (e.g., the fact that the message sender and message recipient attended the same college).

In some embodiments, attribute data 104 includes a set of mandatory attributes and a set of optional attributes. For example, a current job title is a mandatory attribute and honors is an optional attribute. A mandatory attribute is an attribute that must be included in a prompt whereas an optional attribute that can be included but is not necessary, in some embodiments, prompt generation component 160 determines the mandatory and optional attributes using the identifier. For example, an entry level experience identifier would have mandatory attributes for education with optional attributes for experience and certifications. In some embodiments, prompt generation component 160 determines the mandatory and optional attributes using the generate set of instructions. For example, any attributes represented by a placeholder in the set of instructions are mandatory attributes and any attributes not represented by a placeholder are optional attributes. The terms set of mandatory attributes and set of optional attributes as used in this disclosure can be a single mandatory/optional attribute or multiple mandatory/optional attributes. The optional attribute is an attribute that can be used to improve the suggestion generated in response to the prompt, but which is not necessary to create a cohesive prompt/suggestion. For example, content generation system 100 can produce a message/profile summary that makes sense and achieves the user's goals using only mandatory attributes but content generation system 100 can produce a more comprehensive message/profile summary if it also uses optional attributes. A more comprehensive message/profile summary may include additional information that might be beneficial to a reader (e.g., honors and certifications for a profile summary).

In some embodiments, input generation component 164 creates an initial prompt using a first subset of prompt inputs of the set of prompt inputs mapped to the user attributes and updating the initial prompt to generate prompt 106 which includes a second subset of prompt inputs of the set of prompt inputs. This may be useful when the generated suggestion can have two different styles. For example, instruction generation component 162 generates a set of instructions with placeholders for an experience prompt input and an education prompt input. Input generation component 164 generates an initial prompt using the set of instructions and experience and education prompt inputs. This initial prompt can result in suggestions 114 that read in a narrative format explaining the user's experience and education. Input generation component 164 updates the initial prompt to include additional information from attribute data 104. For example, input generation component 164 includes honors data 332 and certifications data 328. This updated portion of the prompt including honors data 332 and certification data 328 can result in suggestions 114 that read in a list format. By generating the prompts for these separately, content generation system 100 ensures that the resulting suggestions 114 include both writing styles where necessary. The terms set of prompt inputs, first subset of prompt inputs, and second subset of prompt inputs as used in this disclosure can be a single prompt input or multiple prompt inputs.

In some embodiments, instruction generation component 162 determines a set of instructions using the identifier. For example, instruction generation component 162 uses an identifier indicating experience level to determine a set of instructions for generating a profile summary for the user based on that experience level. In some embodiments, instruction generation component 162 uses the identifier to retrieve a set of instructions from a data store (such as data store 240 of FIG. 2). The identifier relates to a descriptor for the user. For example, the identifier can be a descriptor of a professional characteristic of the user as included in their profile. In other embodiments, instruction generation component 162 generates or updates a set of instructions based on the identifier. In some embodiments, instruction generation component 162 determines the set of instructions based on a message intent.

The set of instructions includes data for instructing the deep learning model 108 to perform the appropriate task. For example, the set of instructions can include language telling the deep learning model 108 to generate a profile summary for a user with entry level experience associated with the set of user attributes. As an alternative example, the set of instructions can include an instruction, e.g., a natural language instruction, to the deep learning model 108 for the deep learning model 108 to generate a message for a user seeking a job. In some embodiments, instruction generation component 162 determines the set of instructions using a machine learning model. Further details with regards to instruction generation component 162 are described below.

In some embodiments, example generation component 166 determines a suggestion example using the identifier. For example, example generation component 166 uses an identifier indicating experience level to determine a suggestion example based on the experience level. In some embodiments, example generation component 166 uses the identifier to retrieve a suggestion example from a data store (such as data store 240 of FIG. 2). In other embodiments, example generation component 166 generates a suggestion example. For example, example generation component 166 uses a high capacity (e.g., language generation model with many parameters of non-constant values) language generation model to generate a suggestion example. In some embodiments, example generation component 166 stores the suggestion example in a data store (such as data store 240 of FIG. 2). In such embodiments, example generation component 166 may first try to retrieve a suggestion example from a data store and generate the suggestion example if there is no suggestion example available. Further details with regards to example generation component 166 are described below.

Figure 3:
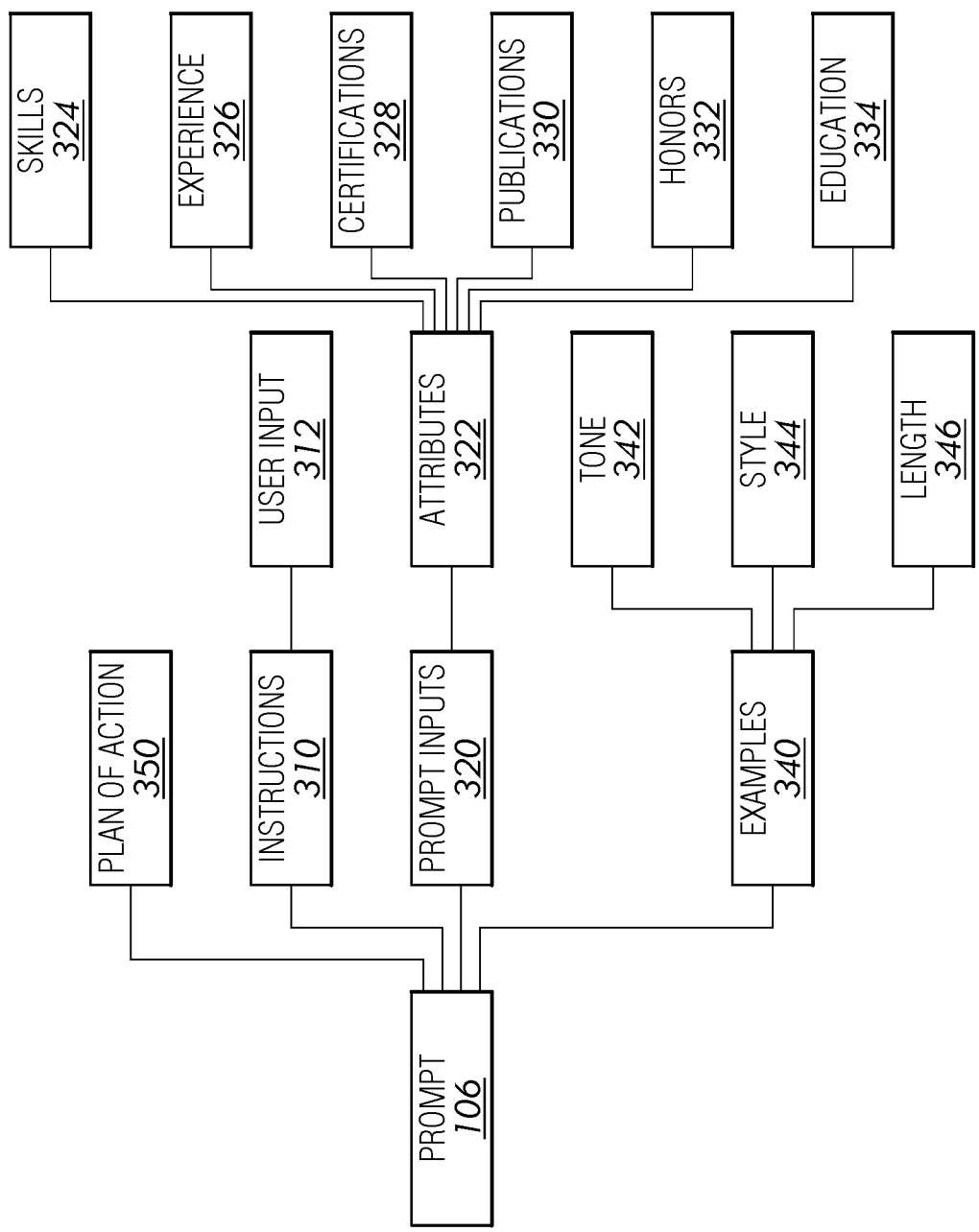
FIG. 3 illustrates an example prompt system in accordance with some embodiments of the present disclosure.

Prompt generation component 160 creates prompt 106, x, based on the extracted attribute data 104. In some embodiments, prompt generation component 160 creates more than one prompt. As shown in FIG. 3, prompt 106 can include instructions 310, prompt input 320, and examples 340. Although illustrated as including instructions 310, prompt input 320, and examples 340, prompt 106 can include different combinations of one or more of these as well as include further components. Further details with regard to prompt generation component 160 are described with reference to FIG. 3.

For each prompt 106, x, the deep learning model 108 produces one or more outputs y and, for each output y, a score $P(x, y)$ that indicates a likelihood of the prompt x and the respective output y occurring together. Using the output(s) y and corresponding score(s) $P(x, y)$, the deep learning model 108 generates first versions of one or more suggestions 114. The first versions of the one or more suggestions 114 each include at least one piece of writing that has been machine-generated by the deep learning model 108.

In other words, output of the deep learning model 108 can be customized for a particular user or user group of the online system based on the attribute data 104 that is selected and used to generate the task descriptions (e.g., prompts) to which the deep learning model 108 is applied. For example, if a particular skill set is common to many users of a particular user group of the online system, a prompt can be configured based on that skill set so that the deep learning model 108 generates text pertaining to the skill set.

The deep learning model 108 includes a deep learning model that is configured using artificial intelligence-based technologies to machine-generate natural language text. In some embodiments, deep learning model 108 is a generative language model. In some embodiments, deep learning model 108 also or alternatively includes one or more generative models that are configured to machine-generate other forms of digital content, such as images, audio, video, etc. Thus, while the term generative language model can be used to refer to generative models that generate text, as used herein, a generative language model can include one or more components that generate non-text output or a combination of text and non-text output. In some examples, the deep learning model includes or is based on one or more generative transformer models, is based on one or more generative pre-trained transformer (GPT) models, one or more bidirectional encoder representations from transformers (BERT) models, one or more XLNET models, and/or one or more other natural language processing (NL) models. Examples of predictive neural models may include, but are not limited to, Generative Pre-Trained Transformers (GPT), BERT, and/or Recurrent Neural Networks (RNNs).

In some implementations, the deep learning model 108 is constructed using a neural network-based machine learning model architecture. In some implementations, the neural network-based architecture includes one or more self-attention layers that allow the model to assign different weights to different words or phrases included in the model input. Alternatively, or in addition, the neural network architecture includes feed-forward layers and residual connections that allow the model to machine-learn complex data patterns including relationships between different words or phrases in multiple different contexts. In some implementations, the deep learning model 108 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the content generation system 100.

The deep learning model 108 is trained on a large dataset of natural language text, deep learning model 108. The size and composition of the dataset used to train the deep learning model 108 can vary according to the requirements of a particular design or implementation of the content generation system 100, deep learning model 108. In some embodiments, deep learning model 108 includes multiple generative language models trained on differently sized datasets. For example, deep learning model 108 can include a high-capacity model (e.g., language generation model with a large number of parameters of non-constant values) used for generating examples as well as a low-capacity model (e.g., language generation model with a smaller number of parameters), which uses the examples from the high capacity model to generate its own outputs.

Deep learning model 108 outputs suggestion 114 which is sent to user system 110. In some embodiments, user system 110 receives and displays suggestion 114 on user interface 112. Further details with regard to displaying suggestion 114 are discussed with reference to FIGS. 4-9. Suggestion 114 includes data generated by deep learning model 108, such as generated language relating to attribute data 104. For example, suggestion 114 can include text for a suggested summary for a profile 102 based on attribute data 104 of the profile 102. As another example, suggestion 114 can include text for a suggest headline for a profile 102 based on attribute data 104 of the profile 102.

In some embodiments, deep learning model 108 sends suggestion 114 to prompt feedback component 168 of prompt generation component 160. Prompt feedback component 168 is a component that receives suggestion 114 from deep learning model 108 and feedback 116 from user system 110 and uses them to generate future prompts. For example, prompt feedback component 168 generates updated prompts based on suggestions 114 and/or feedback 116.

In some embodiments, prompt feedback component 168 includes a trained inference machine learning model which is trained on sentence pairs and uses logical rules about language modeling to generate a performance parameter for suggestion 114. For example, the inference machine learning model is trained to determine whether sentences are redundant and/or contradictory. The inference machine learning model can be, for example, a Multi-Genre Natural Language Inference (MNLI) model or an Adversarial Natural Language Inference (ANLI) model. Prompt feedback component 168 includes the inference machine learning model which uses sentences of suggestion 114 as inputs and determines the performance parameter by labeling pairs of sentences of suggestion 114 as contradictions and/or redundancies. Prompt feedback component 168 determines the performance parameter based on the outputs of the inference machine learning model. For example, prompt feedback component 168 determines the performance parameter based on the number of pairs of sentences compared and the number of contradictions and/or redundancies labeled. In some embodiments, prompt feedback component 168 compares the performance parameter with a threshold to determine whether the performance parameter satisfies the threshold. For example, the threshold may be a number of pairs of sentences labeled contradictory and/or redundant or a ratio of contradictory/redundant sentence pairs to overall number of sentence pairs. Prompt feedback component 168 determines that the performance parameter satisfies the threshold if the comparison indicates that the suggestion 114 includes an unacceptable number of contradictions and/or redundancies or an unacceptable ratio of contradictory and/or redundant sentence pairs to total sentence pairs. In some embodiments, the threshold is set such that prompt feedback component 168 does not allow any contradictory and/or redundant sentence pairs.

In some embodiments, prompt feedback component 168 receives feedback from user system 110. For example, user system 110 includes user interface 112 and, as explained with reference to FIGS. 4-9, user interface 112 includes a graphical user interface (such as graphical user interface 400 of FIGS. 4-9). The graphical user interface can include a profile interface displaying suggestion 114 with which a user can interact. For example, the profile interface displays suggestion 114 and the user interacts with the profile interface to refresh the suggestion. In response to receiving this interaction, user system 110 sends feedback 116 to prompt feedback component 168, indicating that the suggestion should be refreshed. In some embodiments, prompt feedback component 168 generates a performance parameter for suggestion 114 based on feedback 116. For example, feedback such as refreshing, skipping, or changing suggestion 114 is labeled as negative whereas feedback such as accepting suggestion 114 is labeled as positive. In some embodiments, receiving negatively labeled feedback causes prompt generation component 160 to determine that the performance parameter does not meet a threshold. In some embodiments, prompt feedback component 168 generates training data using feedback 116 and prompt 106 to train a prompt generation machine learning model. For example, prompt feedback component 168 trains a machine learning model using prompts and their associated labeled feedback 116. In some embodiments, attribute extraction component 150, instruction generation component 162, input generation component 164 and example generation component 166 use the prompt generation machine learning model to generate their respective outputs. For example, attribute extraction component 150 uses the prompt generation machine learning model to determine attribute data 104 to extract from profile 102.

In some embodiments, example generation component 166 generates an example for suggestion 114 based on the performance parameter for suggestion 114. For example, prompt generation component 160 generates an initial prompt without examples using a zero-shot learning approach. Prompt feedback component 168 determines that the initial suggestion has a performance parameter that satisfies the threshold. For example, prompt feedback component 168 uses the inference machine learning model to determine that there are unacceptable contradictions and/or redundancies or prompt feedback component 168 receives negatively labeled feedback 116 from user system 110. Based on the determination by prompt feedback component 168, example generation component 166 generates an example (such as example 340 of FIG. 3) and prompt generation component 160 generates an updated prompt using the example. In some embodiments, the example is generated by a high-capacity language generation model (e.g., portion of deep learning model 108). In such embodiments, the example may be generated by applying the high-capacity generative language model to the initial prompt. Prompt generation component 160 then applies deep learning model 108 (e.g., low-capacity language generation model) to the updated prompt including the example. In some embodiments, example generation component 166 creates a training set for a suggestion example machine learning model using attribute data 104. Example generation component 166 can then apply the suggestion example machine learning model to the set of attributes to generate a suggestion example (e.g., examples 340 of FIG. 3) for attribute data 104. For example, content generation system 100 can train the suggestion example machine learning model to output suggestion examples based on a job title.

In some embodiments, example generation component 166 uses a trained prompt generation model to generate examples. For example, as discussed above, prompt feedback component 168 generates training data using prompts and associated labeled feedback. Prompt generation component 160 trains a prompt generation model using this training data. Example generation component 166 uses the trained prompt generation model to generate examples. For example, if certain examples lead to suggestions with negative feedback, example generation component 166 learns to avoid those examples. Conversely, if certain examples lead to suggestions with positive feedback, example generation component 166 learns to include these examples.

In some embodiments, input generation component 164 maps an updated set of user attributes of attribute data 104 to a set of prompt inputs based on the performance parameter for suggestion 114. For example, prompt generation component 160 generates an initial prompt based on mapping an initial set of user attributes to a set of prompt inputs. Prompt feedback component 168 determines that the initial suggestion generated using the initial prompt has a performance parameter that satisfies the threshold. For example, prompt feedback component 168 uses the inference machine learning model to determine that there are unacceptable contradictions and/or redundancies or prompt feedback component 168 receives negatively labeled feedback 116 from user system 110. Based on the determination by prompt feedback component 168, input generation component 164 maps an updated set of user attributes of attribute data 104 to the set of prompt inputs. Using the updated set of user attributes, prompt generation component 160 generates an updated prompt. Prompt generation component 160 applies deep learning model 108 to the updated prompt to generate an updated suggestion.

In some embodiments, input generation component 164 comprises attribute extraction component 150 and input generation component 164 extracts updated attribute data 104 rather than mapping an updated set of user attributes. In some embodiments, input generation component 164 uses a trained prompt generation model to extract attribute data 104 and/or map the set of user attributes to prompt inputs. For example, as discussed above, prompt feedback component 168 generates training data using prompts and associated labeled feedback. Prompt generation component 160 trains a prompt generation model using this training data. Input generation component 164 uses the trained prompt generation model to extract updated attribute data and/or map an updated set of user attributes to the set of prompt inputs. For example, if extracting certain attribute data and/or mapping a certain set of user attributes leads to negative feedback, input generation component 164 learns to avoid extracting that attribute data and/or mapping that set of user attributes. Conversely, if extracting certain attribute data and/or mapping a certain set of user attributes leads to positive feedback, input generation component 164 learns to extract that attribute data and/or map those user attributes.

In some embodiments, instruction generation component 162 generates an updated set of instructions based on the performance parameter for suggestion 114. For example, prompt generation component 160 generates an initial prompt using an initial set of instructions. Prompt feedback component 168 determines that the initial suggestion generated using the initial prompt has a performance parameter that satisfies the threshold. For example, prompt feedback component 168 uses the inference machine learning model to determine that there are unacceptable contradictions and/or redundancies or prompt feedback component 168 receives negatively labeled feedback 116 from user system 110. Based on the determination by prompt feedback component 168, instruction generation component 162 generates an updated set of instructions. Using the updated set of instructions, prompt generation component 160 generates an updated prompt. Prompt generation component 160 applies deep learning model 108 to the updated prompt to generate an updated suggestion.

In some embodiments, instruction generation component 162 uses a trained prompt generation model to generate the set of instructions. For example, as discussed above, prompt feedback component 168 generates training data using prompts and associated labeled feedback. Prompt generation component 160 trains a prompt generation model using this training data. Instruction generation component 162 uses the trained prompt generation model to generate an updated set of instructions. For example, if a certain set of instructions leads to negative feedback, instruction generation component 162 learns to avoid that set of instructions. Conversely, if a certain set of instructions leads to positive feedback, instructions generation component 162 learns to generate that set of instructions.

In the embodiment of FIG. 2, computing system 200 includes a user system 110, a network 220, an application software system 230, a data store 240, an attribute extraction component 150, and a prompt generation component 160. Each of these components of computing system 200 are described in more detail below.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 230.

User interface 112 is any type of user interface as described above. User interface 112 can be used to input search queries and view or otherwise perceive output that includes data produced by application software system 230. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs). Further details with regard to user interface 112 are disclosed with reference to FIGS. 4-9.

Network 220 can be implemented on any medium or mechanism that provides for the exchange of data, signals, and/or instructions between the various components of computing system 200. Examples of network 220 include, without limitation, a Local Area Network (LAN), a Wide Area Network (WAN), an Ethernet network or the Internet, or at least one terrestrial, satellite or wireless link, or a combination of any number of different networks and/or communication links.

Application software system 230 is any type of application software system that includes or utilizes functionality and/or outputs provided by attribute extraction component 150, prompt generation component 160, and/or deep learning model 108. Examples of application software system 230 include but are not limited to online services including connections network software, such as social media platforms, and systems that are or are not be based on connections network software, such as general-purpose search engines, content distribution systems including media feeds, bulletin boards, and messaging systems, special purpose software such as but not limited to job search software, recruiter search software, sales assistance software, advertising software, learning and education software, enterprise systems, customer relationship management (CRM) systems, or any combination of any of the foregoing.

A client portion of application software system 230 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 230 and/or a server portion of application software system 230 can receive the input, perform at least one operation using the input, and return output using an HTTP response that the web browser receives and processes.

Data store 240 can include any combination of different types of memory devices. Data store 240 stores digital data used by user system 110, application software system 230, attribute extraction component 150, prompt generation component 160, and/or deep learning model 108. Data store 240 can reside on at least one persistent and/or volatile storage device that can reside within the same local network as at least one other device of computing system 200 and/or in a network that is remote relative to at least one other device of computing system 200. Thus, although depicted as being included in computing system 200, portions of data store 240 can be part of computing system 200 or accessed by computing system 200 over a network, such as network 220.

While not specifically shown, it should be understood that any of user system 110, application software system 230, data store 240, attribute extraction component 150, prompt generation component 160, and deep learning model 108 includes an interface embodied as computer programming code stored in computer memory that when executed causes a computing device to enable bidirectional communication with any other of user system 110, application software system 230, data store 240, attribute extraction component 150, prompt generation component 160, and deep learning model 108 using a communicative coupling mechanism. Examples of communicative coupling mechanisms include network interfaces, inter-process communication (IPC) interfaces and application program interfaces (APIs).

Each of user system 110, application software system 230, data store 240, attribute extraction component 150, prompt generation component 160, and deep learning model 108 is implemented using at least one computing device that is communicatively coupled to electronic communications network 220. Any of user system 110, application software system 230, data store 240, attribute extraction component 150, prompt generation component 160, and deep learning model 108 can be bidirectionally communicatively coupled by network 220. User system 110 as well as one or more different user systems (not shown) can be bidirectionally communicatively coupled to application software system 230.

A typical user of user system 110 can be an administrator or end user of application software system 230, attribute extraction component 150, prompt generation component 160, and/or deep learning model 108. User system 110 is configured to communicate bidirectionally with any of application software system 230, data store 240, attribute extraction component 150, prompt generation component 160, and/or deep learning model 108 over network 220.

The features and functionality of user system 110, application software system 230, data store 240, attribute extraction component 150, prompt generation component 160, and deep learning model 108 are implemented using computer software, hardware, or software and hardware, and can include combinations of automated functionality, data structures, and digital data, which are represented schematically in the figures. User system 110, application software system 230, data store 240, attribute extraction component 150, prompt generation component 160, and deep learning model 108 are shown as separate elements in FIG. 2 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

FIG. 3 illustrates an example prompt system 300 in accordance with some embodiments of the present disclosure. As shown in FIG. 3, prompt 106 can include instructions 310, prompt inputs 320, examples 340, and plan of action 350. For example, prompt 106 includes a set of instructions telling a generative language model, such as deep learning model 108 of FIG. 1 to generate a profile summary for an entry level accountant as well as prompt inputs 320 indicating the profile summary should include that the user has a bachelor's degree in accounting and high honors during their time in college. Additionally, prompt 106 can include an example of a profile summary for entry level accountant.

In some embodiments, prompt 106 includes instructions 310. Instructions 310 includes data for instructing the deep learning model 108 to perform the appropriate task. In some embodiments, instructions 310 is text including instructions for deep learning model 108. The text of instructions 310 includes placeholders or gaps for other components of prompt 106. For example, instructions 310 includes gaps for filling in descriptors for a profile (such as profile 102 of FIG. 1) using prompt inputs 320. In some embodiments, instructions 310 includes gaps for filling in examples such as examples 340. In some embodiments, instructions 310 includes gaps for filling in desired tones. For example, desired tones can include text or identifiers indicating a tone for deep learning model 108 to use when generating suggestions 114.

In some embodiments, instructions 310 are based on or include user input 312. For example, user input 312 can include a selection of an update suggestion. The update suggestions can be, for example, a selection to generate a profile summary or a selection to generate a profile headline. In response to receiving the selection of one of the update suggestions, prompt generation component 160 generates instructions 310 for that selection. For example, instructions 310 for user input 312 indicating a profile summary update suggestion instruct the deep learning model 108 to generate a profile summary.

In some embodiments, prompt 106 includes prompt inputs 320. Prompt inputs 320 include data to be input into prompt 106. For example, prompt inputs 320 can include attributes 322 such as user attributes included in attribute data 104 that fit with instructions 310. For example, instructions 310 include a placeholder indicating where a user's experience is inserted and prompt generation component 160 generates prompt 106 by inputting a user experience attribute from attribute data 104 into associated fillers or gaps in instructions 310. As shown in FIG. 3, attributes 322 can include skills 324, experience 326, certifications 328, publications 330, honors 332, and education 334, among others. In some embodiments, attributes 322 are determined from a profile such as profile 102 of FIG. 1. In some embodiments, attributes 322 are determined based on a profile such as profile 102 of FIG. 1. In some embodiments, attributes 322 are determined based on a profile for a user other than the user associated with profile 102. For example, attributes 322 are attributes for a profile with the same job title or a similar set of skills.

In some embodiments, prompt inputs 320 includes an input for tone 342. For example, prompt inputs 320 includes an input specifying a tone to use when generating the suggestion for prompt 106. In some embodiments, content generation system 100 switches the tone in response to receiving negatively labeled user input for the suggestion. For example, in response to receiving feedback (e.g., feedback 116) indicating that a user of user system 110 refreshed or rejected a suggestion, input generation component 162 changes the tone of the initial prompt (e.g., from informal to professional) and generates an updated suggestion using the updated tone.

In some embodiments, tone 342 is determined based on the connection between two profiles. For example, if a user of the first profile initiates electronic messaging with a user of a second profile, prompt generation component 160 can determine a connection between the profiles based on similarities in extracted attribute data as described with reference to FIG. 1 and FIG. 16. In such an embodiment, the connection may be, for example, a shared connection (e.g., both profiles are connected with the same person and/or people). Prompt generation component 160 can determine the tone to use based on the quality and/or number of these shared connections. For example, messaging between people who share many different connections would have a less formal tone than messaging between people who share no connections.

In some embodiments, content generation system 100 uses a user input to determine the tone. For example, a user interacts with a graphical user interface (e.g., graphical user interface 400) indicating that they want an informal tone. In response to this user interaction, prompt generation component 160 generates a prompt with the desired tone. In some embodiments, content generation system 100 uses a user input to determine other prompt inputs 320. For example, a user input can be directed to length 346 or style 344. In some embodiments, tone 342, style 344, and length 346 are used as examples 340 rather than prompt input 320. For example, a prompt input 320 for tone 342, style 344, and/or length 346 explicitly includes the desired tone 342, style 344, and/or length 346 in the prompt (e.g., write a suggestion with an informal tone), whereas an example 340 for tone 342, style 344, and/or length 346 includes a piece of writing to be used as an example when generating the suggestion (e.g., write a suggestion with the same tone as this example).

In some embodiments, prompt 106 includes examples 340. In some embodiments, examples 340 are the output of applying a high-capacity generative language model to an initial prompt as described with reference to FIG. 1. Examples can include tone examples 342, style examples 344, and/or length examples 346. For example, prompt 106 can include examples 340 with a desired tone causing the generative language model to output suggestions in the example tone (e.g., informal, professional, assertive, humorous, etc.). Similarly, style examples 344 include examples with a certain literary style such as expository, descriptive, persuasive, narrative, etc. Length examples 346 can also be used to ensure a minimum, ideal, or maximum length for a suggestion. In some embodiments, examples 340 are predetermined and stored in content generation system 100, such as in data store 240. In some embodiments, examples 340 are generated by a machine learning model. For example, as described above, examples 340 are generated by a high-capacity generative language model.

In some embodiments, prompt 106 includes plan of action 350. Plan of action 350 is a conditioned content generation method to improve relevance, engagement, and diversity of the generated content while mitigating hallucination and prompt injection challenges. For example, instead of or in addition to including step-by-step instructions 310, prompt 106 includes a plan of action 350. In some embodiments, plan of action 350 is an instruction by prompt generation component 160 to deep learning model 108 to generate a plan and ensure the generated plan captures important content requirements of prompt 106. For example, for a profile summary generation, plan of action 350 defines content requirements that suggestion 114 includes a headline and a summary. Alternatively, for a message generation, plan of action 250 can include content requirements that suggestion 114 includes an introduction and a reason for messaging. In some embodiments, prompt feedback component 168 uses plan of action 350 to generate a performance parameter for suggestion 114. In some embodiments, prompt feedback component 168 updated plan of action 350 based on feedback 116. For example, in response to receiving negative feedback associated with suggestion 114, prompt feedback component 168 trains machine learning model to update plan of action 350. In some embodiments prompt generation component 160 determines plan of action 350 based on user input. For example, in response to user input indicating that generated content should follow certain content requirements, prompt generation component 160 updates plan of action 350 to include these content requirements. In some embodiments, plan of action 350 is based on the message intent. For example, a plan of action 350 for a message intent to seek work includes content requirements to make an introduction and an instruction to mention, in the machine-generated response, the job being sought.

Figure 4:
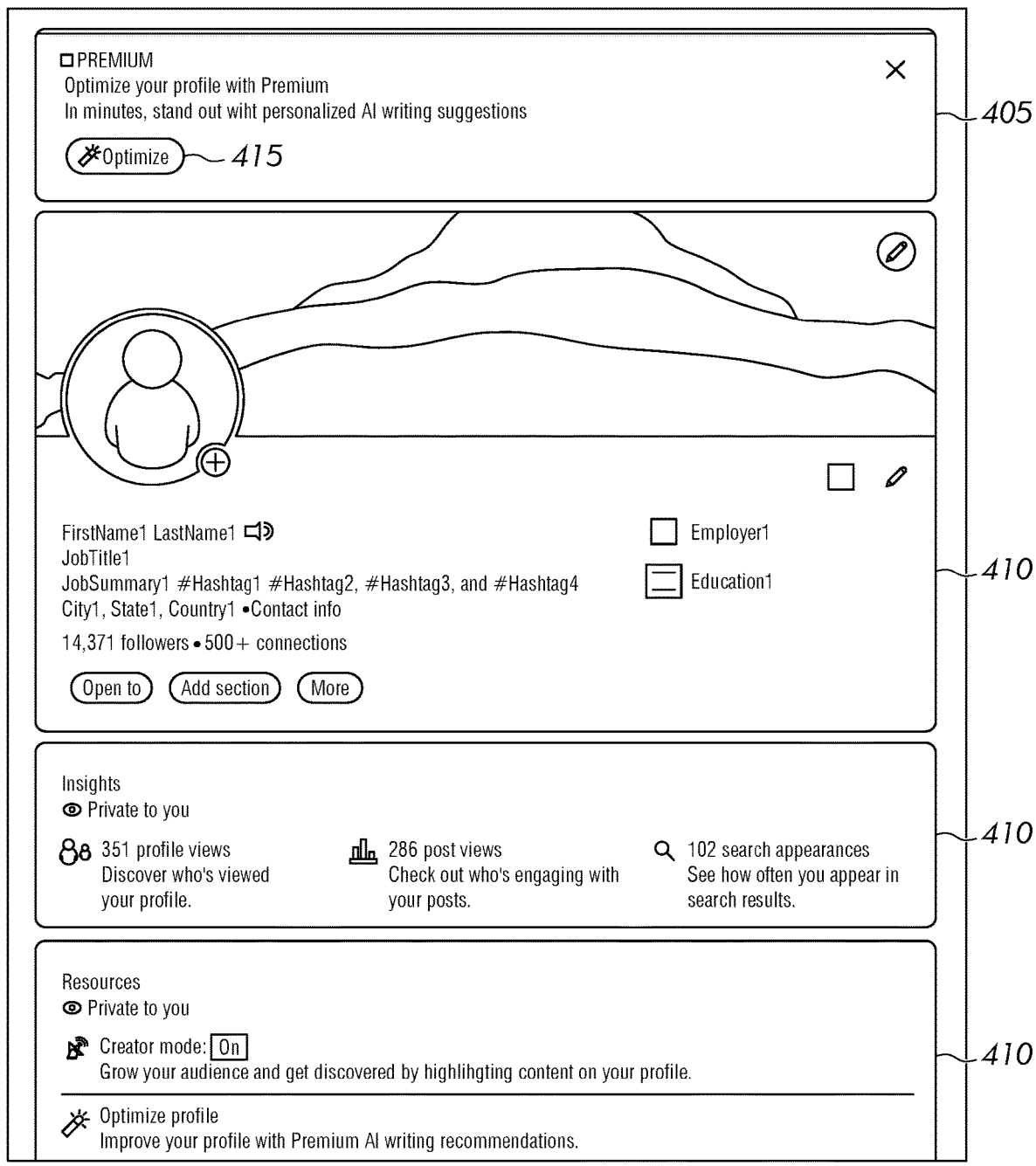
FIG. 4 illustrates an example graphical user interface in accordance with some embodiments of the present disclosure.
Figure 5:
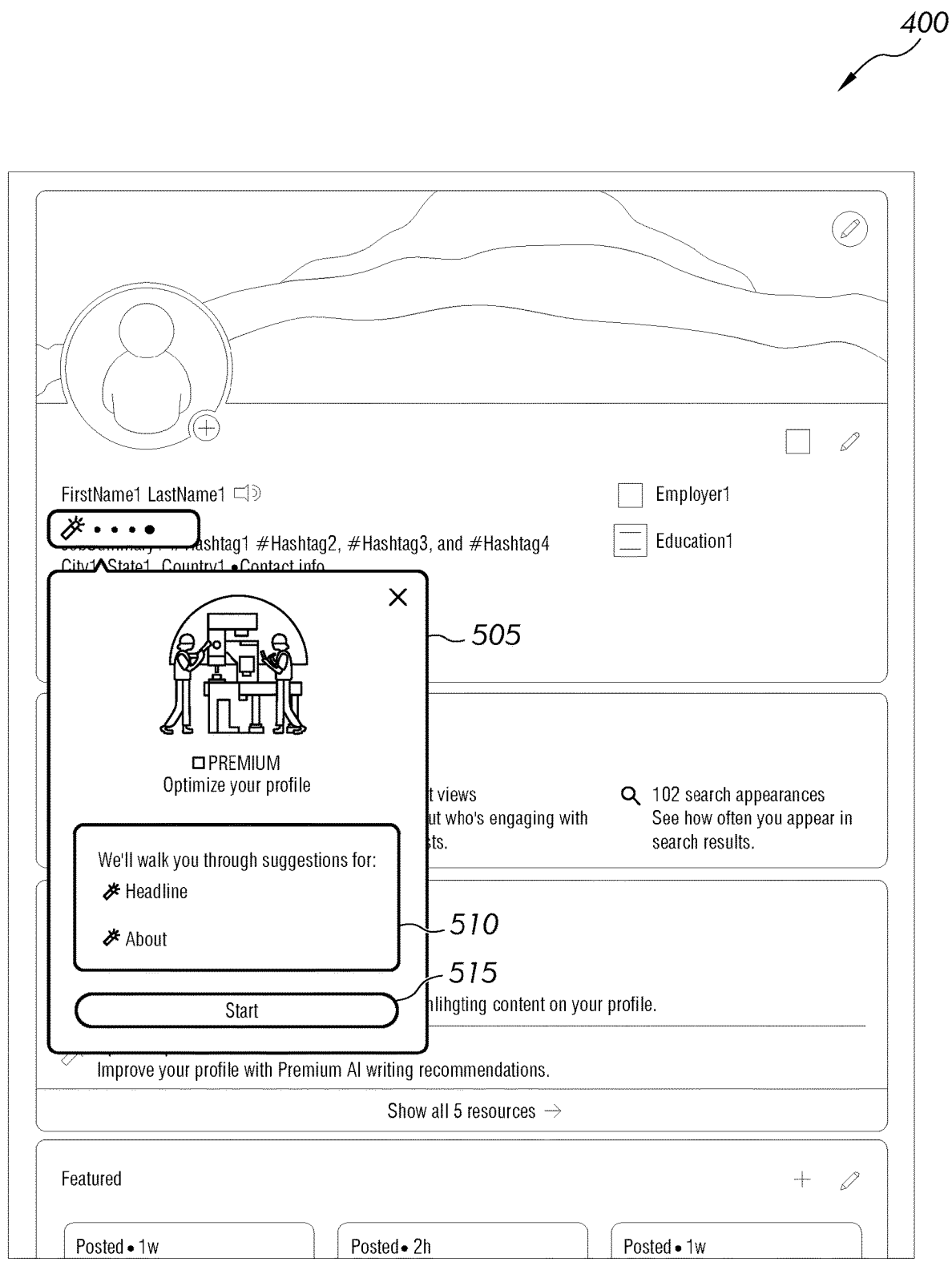
FIG. 5 illustrates another example graphical user interface in accordance with some embodiments of the present disclosure.

FIG. 4 illustrates an example graphical user interface 400 in accordance with some embodiments of the present disclosure. As shown in FIG. 4, graphical user interface 400 includes a user profile display 410 and a profile update banner 405. Profile update banner 405 is a widget located within graphical user interface 400 that includes a button 415 for entering a profile interface. In response to receiving a user input of a selection of button 415, graphical user interface 400 updates as shown in FIG. 5. In some embodiments, graphical user interface 400 is implemented on a client device such as user interface 112 of user system 110. User profile display 410 is a display associated with a profile such as profile 102 of FIG. 1. For example, user profile display 410 displays aspects of the profile. For example, user profile display 410 includes user attributes such as JobTitle1, JobSummary1, #Hashtag1, #Hashtag2, #Hashtag3, #Hashtag4, Employer1, and Education1. In some embodiments, the client device (e.g., user system 110) sends input to content generation system 100 including one or more of user attributes.

FIG. 5 illustrates an example graphical user interface 400 in accordance with some embodiments of the present disclosure. In response to a user selecting button 415 of FIG. 4, graphical user interface 400 updates to display profile interface 505.

In some embodiments, as shown in FIG. 5, profile interface 505 is a floating interface positioned in front of user profile display 410. In some embodiments, profile interface 505 includes update suggestions 510. For example, as shown in FIG. 5, update suggestions 510 can include a headline update suggestion and a summary update suggestion. In some embodiments, profile interface 505 includes update suggestion selection buttons such as start button 515. In some embodiments, profile interface 505 includes a button or other method of selecting a specific update suggestion which causes graphical user interface 400 to update with the appropriate interface for the selected update suggestion. In some embodiments, as shown in FIG. 5, profile interface 505 includes a start button 515 which selects the update suggestions in a predetermined order. For example, selecting start button 515 causes profile interface 505 to update and a headline section 605.

Figure 6:
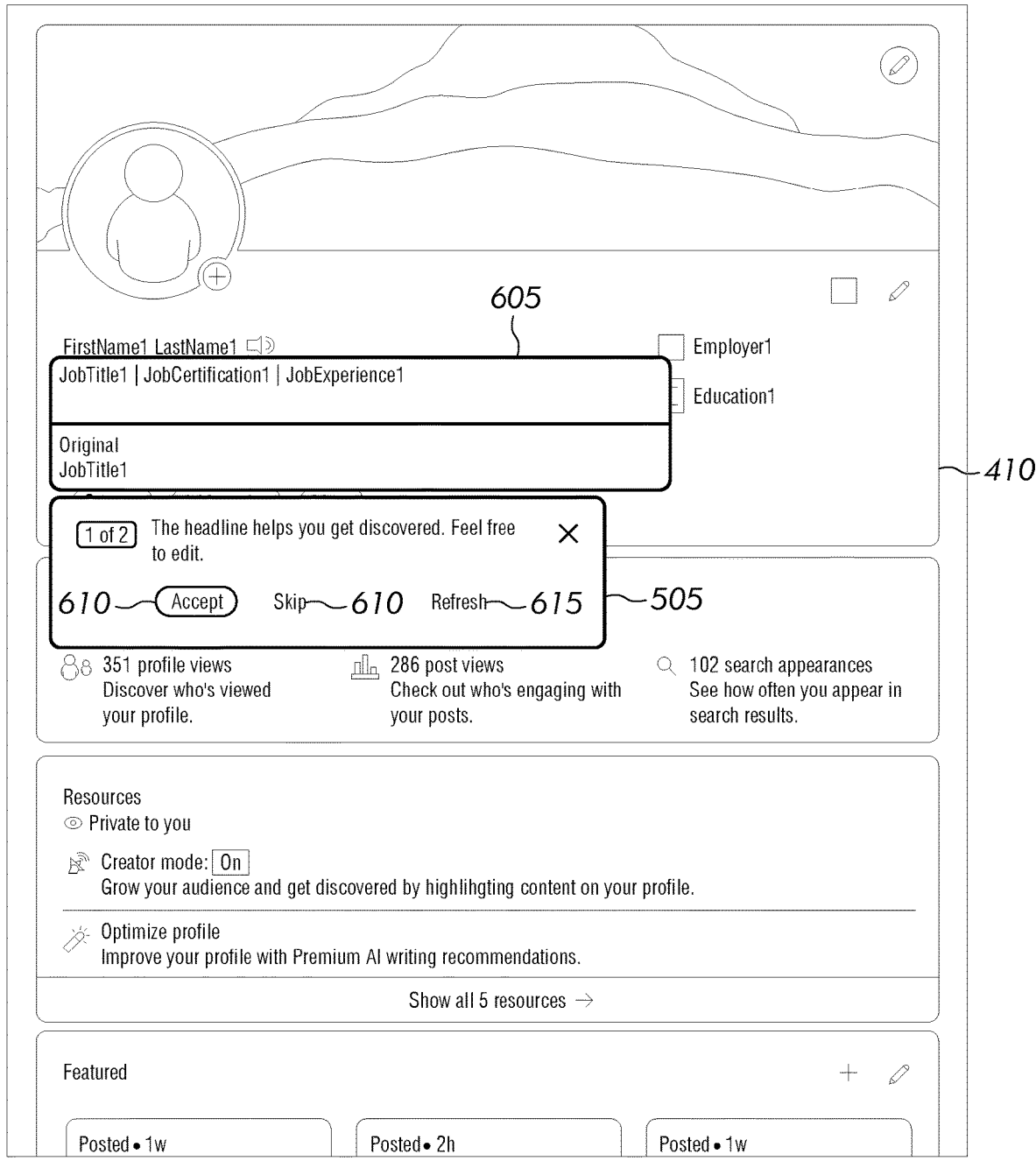
FIG. 6 illustrates another example graphical user interface in accordance with some embodiments of the present disclosure.

FIG. 6 illustrates an example graphical user interface 400 in accordance with some embodiments of the present disclosure. In response to a user making an update suggestion, profile interface 505 updates based on the selected update suggestion. As shown in FIG. 6, profile interface 505 includes headline section 605. In some embodiments, headline section 605 is part of the floating interface of profile interface 505 positioned over user profile display 410. For example, headline section 605 is a floating interface above the headline section of user profile display 410. Headline section 605 includes text generated by content generation system 100. For example, content generation system 100 generates a suggestion using attribute data of user profile display 410. Graphical user interface 400 then displays the suggestion in headline section 605. In some embodiments, profile interface 505 updates to include headline section 605 in response to a user interaction with a user feedback interface such as user feedback interface 610. In some examples, the content generation system 100 is capable of also using attribute data associated with other publicly available user profiles. In some embodiments, the content generation system is capable of using attribute data from one or more of the user and/or the attribute data from other publicly listed users.

In some embodiments, profile interface 505 includes user feedback interface 610. For example, user feedback interface 610 provides options for a user to provide feedback on the suggestions in headline section 605. In some embodiments, content generation system 100 receives feedback (such as feedback 116 of FIG. 1) in response to the user interacting with user feedback interface 610. As shown in FIG. 6, user feedback interface can include an acceptance button and a skip button. In some embodiments, user feedback interface 610 includes a refresh button 615. In such embodiments, content generation system 100 can regenerate headline section 605 in response to receiving a user interaction with the refresh button 615. In some embodiments, content generation system 100 updates the prompt to change a tone for the suggestion to be displayed. For example, content generation system 100 updates a tone as explained with reference to FIG. 3 in response to a user interaction with user feedback interface 610. In some embodiments, receiving a user interaction with user feedback interface 610 causes the client device (e.g., user system 110) to send feedback (e.g., feedback 116) to a prompt feedback component (e.g., prompt feedback component 168). As explained with reference to FIG. 3, in response to receiving negatively labeled feedback (e.g., user interaction with the skip button), content generation system 100 generates an updated prompt through extracting updated attribute data, mapping an updated set of user attributes, generating an updated set of instructions, and/or generating an example. Additionally, in response to a user interaction with user feedback interface 610, graphical user interface 400 updates to display a suggestion in a summary section 705.

Figure 7:
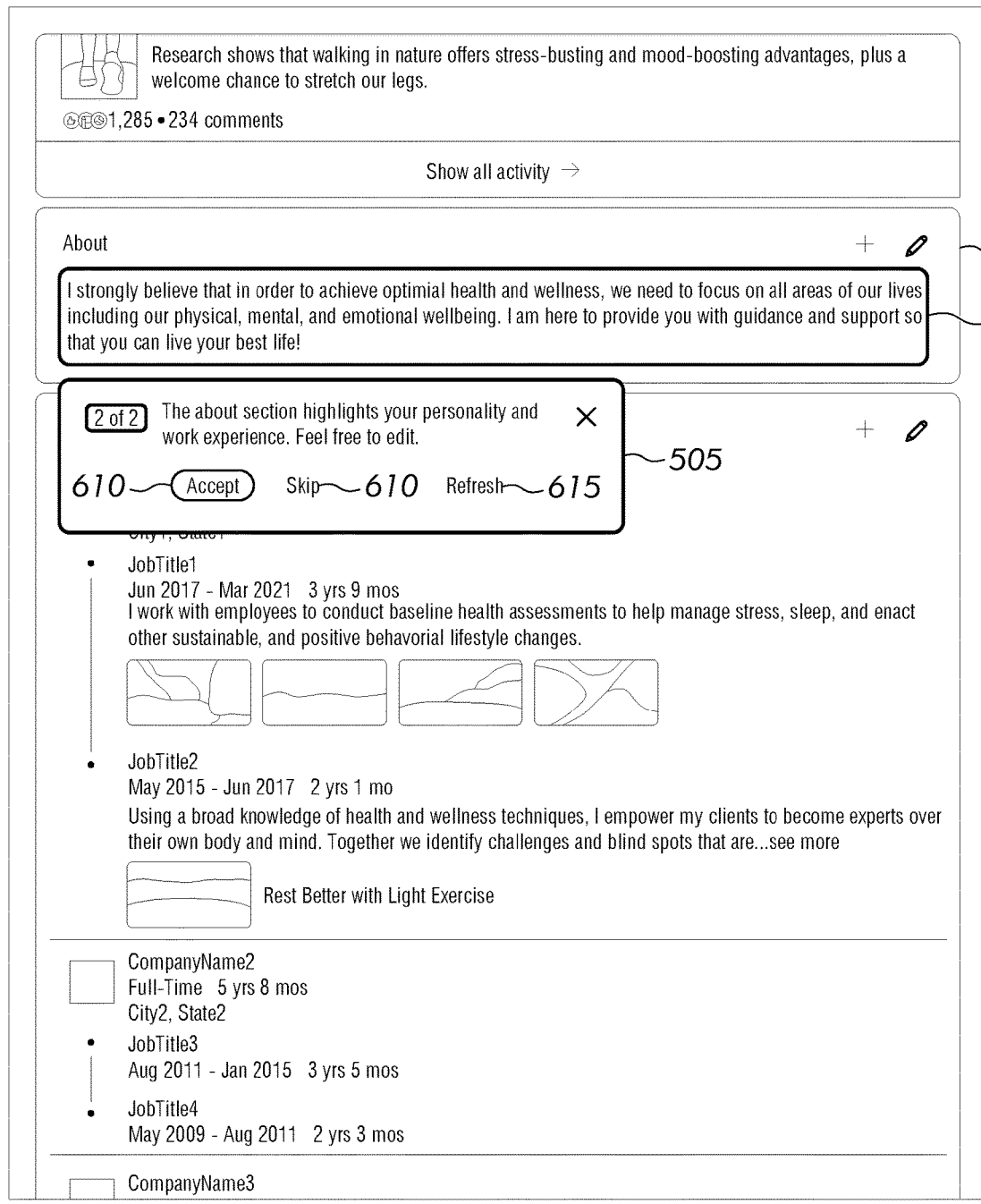
FIG. 7 illustrates another example graphical user interface in accordance with some embodiments of the present disclosure.

FIG. 7 illustrates an example graphical user interface 400 in accordance with some embodiments of the present disclosure. In response to a user making an update suggestion, profile interface 505 updates based on the selected update suggestion. As shown in FIG. 7, profile interface 505 includes summary section 705. In some embodiments, summary section 705 is part of the floating interface of profile interface 505 positioned over user profile display 410. For example, summary section 705 is a floating interface above the summary section of user profile display 410. Summary section 705 includes text generated by content generation system 100. For example, content generation system 100 generates a suggestion using attribute data of user profile display 410. Graphical user interface 400 then displays the suggestion in summary section 705. In some embodiments, profile interface 505 updates to include summary section 705 in response to a user interaction with a user feedback interface such as user feedback interface 610.

In some embodiments, profile interface 505 includes user feedback interface 610. For example, user feedback interface 610 provides options for a user to provide feedback on the suggestions in summary section 705. In some embodiments, content generation system 100 receives feedback (such as feedback 116 of FIG. 1) in response to the user interacting with user feedback interface 610. As shown in FIG. 7, user feedback interface can include an acceptance button and a skip button. In some embodiments, user feedback interface 610 includes a refresh button. In such embodiments, content generation system 100 can regenerate summary section 705 in response to receiving a user interaction with the refresh button. In some embodiments, content generation system 100 updates the prompt to change a tone, purpose or intent for the suggestion to be displayed. For example, content generation system 100 updates a tone as explained with reference to FIG. 3 in response to a user interaction with user feedback interface 610. In some embodiments, receiving a user interaction with user feedback interface 610 causes the client device (e.g., user system 110) to send feedback (e.g., feedback 116) to a prompt feedback component (e.g., prompt feedback component 168). As explained with reference to FIG. 3, in response to receiving negatively labeled feedback (e.g., user interaction with the skip button), content generation system 100 generates an updated prompt through extracting updated attribute data, mapping an updated set of user attributes, generating an updated set of instructions, and/or generating an example. Additionally, in response to a user interaction with user feedback interface 610, graphical user interface 400 updates to display an update completion display in profile interface 505.

FIG. 8 illustrates an example graphical user interface 400 in accordance with some embodiments of the present disclosure. In response to a user interacting with a user feedback interface (e.g., user feedback interface 610 or 610) profile interface 505 updates to display an update completion display in profile interface 505. As shown in FIG. 8, profile interface 505 includes an update completion display and update completion interface 805. In some embodiments, the update completion display is part of the floating interface of profile interface 505 positioned over user profile display 410. In response to a user interacting with update completion interface 805, profile interface 505 is closed and leaves profile display 410 with the changes implemented by the user.

Figure 9:
FIG. 9 illustrates another example graphical user interface in accordance with some embodiments of the present disclosure.

FIG. 9 illustrates an example graphical user interface 400 in accordance with some embodiments of the present disclosure. As shown in FIG. 9, in response to a user interacting with update completion interface 805, profile interface 505 is closed and leaves profile display 410 with the changes implemented by the user. For example, profile display 410 includes any changes to headline section 605 and summary section 705 implemented by content generation system 100 in response to user interactions with graphical user interface 400.

Figure 10:
FIG. 10 illustrates an example graphical user interface in accordance with some embodiments of the present disclosure.

FIG. 10 illustrates an example graphical user interface 1000 in accordance with some embodiments of the present disclosure. In one example, as shown in FIG. 10, graphical user interface 1000 includes a subject interface 1005, message body interface 1010, button 1015 for entering messaging interface, and send button 1020 to send message. As shown in FIG. 10, the messaging interface facilitates electronic messaging between a sender (e.g., user that initiated the electronic messaging) and a recipient (user receiving the electronic message). Although illustrated and described as a message, similar graphical user interfaces can be implemented for other content such as posts and articles. In some embodiments, graphical user interface 1000 is implemented on a client device such as user interface 112 of user system 110. For example, subject interface 1005 displays an interface for the user to enter a subject for the message. Message body interface 1010 offers an interface for the user to enter a message manually or to select button 1015 to enter messaging interface causing content generation system 100 to generate a message in message body interface 1010. In some examples, the content generation system 100 is capable of generating the message without having previously received any text input by the user. For example, content generation system 100 can use the user profile of the message sender and the message recipient (e.g., profile 102 of FIG. 1) to determine the prompt 106. In one embodiment, content generation system 100 uses the user profile of the message recipient to determine that the message recipient is associated with a job posting and generates a prompt 106 with message sender's qualification (as determined from attribute data from message sender's profile) to generate a suggestion for a message to message recipient. In other embodiments, content generation system 100 uses the job title of the message sender and/or receiver to determine the prompt 106. For example, if message sender has a job title of a job recruiter, content generation system 100 may use examples (e.g., examples 340 of FIG. 3) of job recruiter messages to generate suggestion 114, In some embodiments, graphical user interface 1000 includes a first and last name for the user being messaged as well as the job title of the user being messaged (e.g., FirstName1, LastName1, and JobTitle1). A user of user interface 112 can select button 1015 causing graphical user interface 1000 to update with message drafting interface 1105. Although described as sender and recipient, it should be noted that in embodiments of electronic messaging as described herein, the sender can refer to the initiator of the electronic messaging and not necessarily the sender of the most recent electronic message. For example, a first user (e.g., sender) sends a message to a second user (e.g., recipient) and the second user responds to the first user's message by sending their own message (of which the second user is the sender and the first user is the recipient). In such a situation the original sender may still be referred to as the sender. It should be noted, however, that the embodiments described can be implemented on behalf of the sender or recipient.

Figure 11:
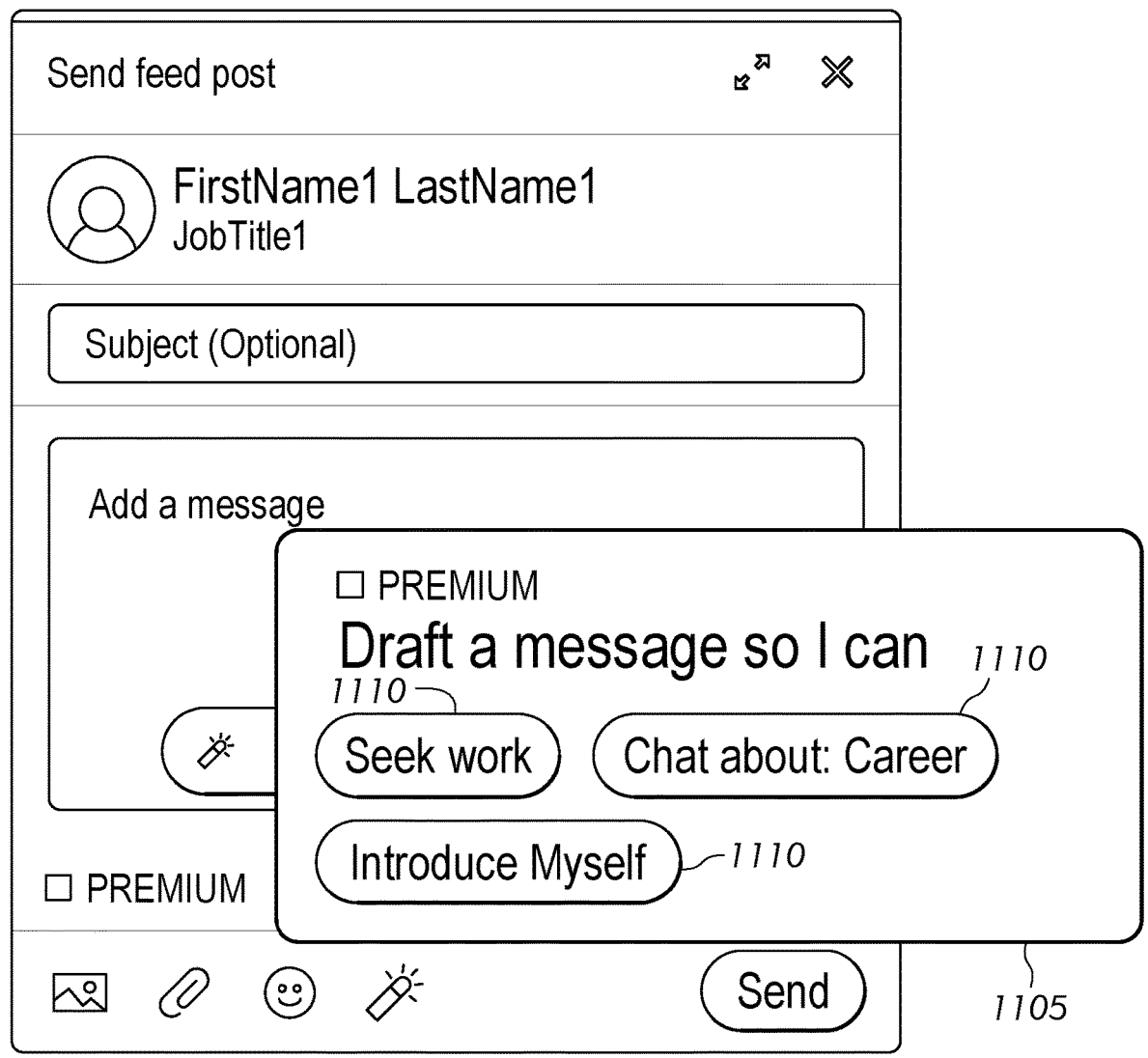
FIG. 11 illustrates another example graphical user interface in accordance with some embodiments of the present disclosure.

FIG. 11 illustrates another example graphical user interface 1000 in accordance with some embodiments of the present disclosure. As shown in FIG. 11, graphical user interface 1000 includes message drafting interface 1105. In some embodiments, message drafting interface 1105 includes message intent options 1110. For example, as shown in FIG. 11, message intent options 1110 can include "Seek work," "Introduce myself," and "Chat about: Career." In response to a user selecting the message intent option 1110 to seek work, content generation system 100 generates suggestions (e.g., suggestion 114 of FIG. 1) for messages for seeking work.

In some embodiments, content generation system 100 determines message intent options 1110 based on extracted attribute data (such as attribute data 104 of FIG. 1). For example, the extracted attribute data can include historical activity data for a user of graphical user interface 1000. Content generation system 100 can infer an intent for the user based on this historical activity data. By way of example, content generation system 100 can infer that a user is seeking work based on recent interactions between the user and job postings or even based on the lack of a current position on the user's profile. Similarly, content generation system 100 can infer that a user is seeking to introduce themselves based on recent interactions between the user and a post related to the message recipient. As another example, content generation system 100 can infer message intent for the user based on other attribute data such as the current position for a user. For example, content generation system 100 can assume an intent to recruit based on the user having a position identifying that they are a recruiter. Similarly, positions such as a start-up founder or product salesperson can cause content generation system 100 to infer other messaging intents (e.g., raise funding for start-up or sell a product).

In some embodiments, content generation system 100 determines message intent options 1110 based on a connection. For example, in response to extracting attribute data from both the profile of message sender and the profile of the message recipient, content generation system 100 determines a connection based on similarities between extracted attribute data of the two profiles. In some embodiments, the connection includes multiple similarities between the two profiles and the similarities are ranked with higher degrees of similarity (or higher impact similarities) ranked higher than lower degrees of similarity (or lower impact similarities). For example, higher degrees of similarity indicate a more precise match between the two profiles (such as the same exact job position) whereas lower degrees of similarity indicate a less precise match between the two profiles (such as the same general industry). Higher impact similarities, meanwhile, refer to similarities which are rarer or which would have more of an impact on someone than lower impact similarities. For example, attendance of the same college has a higher impact than shared skills.

Content generation system 100 causes the message intent options 1110 to be displayed on graphical user interface 1000. For example, content generation system 100 can cause a predetermined set of message intent options 1110 to be displayed in the messaging interface. In some embodiments, content generation system 100 includes message intent options 1110 with the ability for the user to add additional content to the message intent options 1110. For example, as shown in FIG. 11, one of message intent options 1110 is "Chat about: Career." In some embodiments, the user can interact with graphical user interface 1000 to select an option to chat about. For example, the user can select "Career" from a menu of options for initiating an electronic messaging. Alternatively, graphical user interface 1000 can include a text box or other interface for a user of graphical user interface 1000 to manually input a topic to chat about.

In some embodiments, content generation system 100 causes intent options 1110 to be displayed on graphical user interface based on historical activity of the user. In some embodiments, content generation system 100 determines intent options 1110 including a message intent option 1110 to seek work based on historical activity indicating the user has been interacting with a lot of job postings. In such embodiments, in response to a user selecting intent option 1110 to boost employability for the user profile, content generation system 100 generates a prompt 106 for a suggestion 114 for the selected intent option 1110 (e.g., seeking work, updating resume, generating cover letter, professional influencer, etc.). Content generation system 100 can determine instructions based on the selected intent option 1110, extract different attribute data 104 based on the selected intent option 1110, and/or generate examples based on the selected intent option 1110. In response to selecting one of the message intent options 1110, graphical user interface 1000 updates to display content generation progress indicator 1205.

Figure 12:
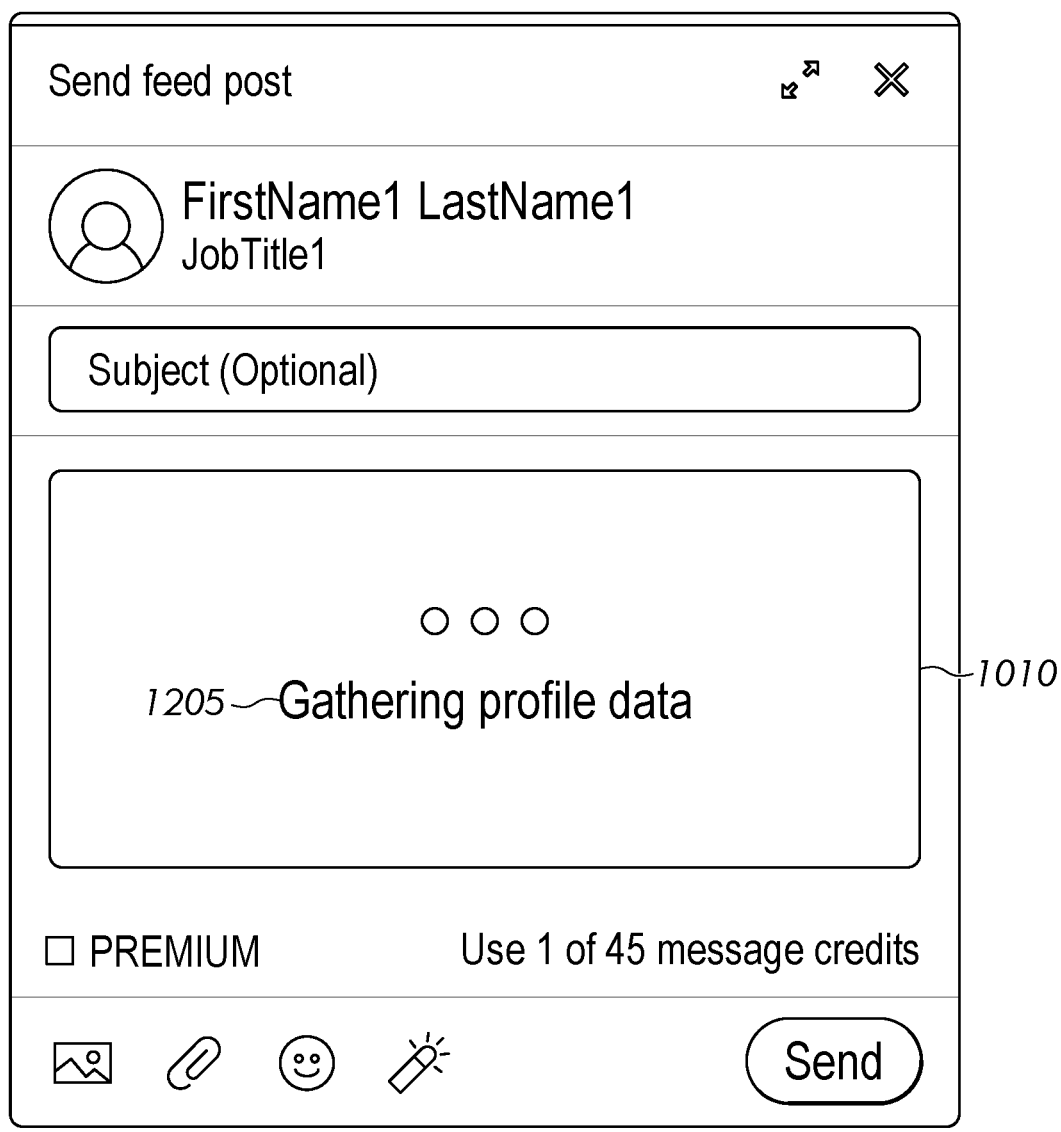
FIG. 12 illustrates another example graphical user interface in accordance with some embodiments of the present disclosure.

In some embodiments, content generation system 100 extracts attribute data from a post based on the selected message intent option 1110. For example, in response to determining that a user is seeking work (e.g., either in response to a selection by the user or an inference by content generation system 100), content generation system 100 extracts attribute data from a post associated with a job that the user is interested in. In some embodiments, content generation system 100 extracts the attribute data from the post based on historical activity data of the user. For example, if the user has recently applied to a job and is now messaging the profile of the person and/or company that posted the job, content generation system 100 can infer that the user intends to talk about that job posting and extracts attribute data from the job posting to use in prompt generation. Alternatively, content generation system 100 can infer a job posting based on attribute data extracted from the user's profile. For example, in response to determining that a user is seeking work (e.g., either in response to a selection by the user or an inference by content generation system 100), content generation system 100 compares the attribute data extracted from the user's profile to attribute data extracted from job postings associated with the message recipient. This comparison can be based on attributes such as skills extracted from the user profile as compared to skills extracted from the job posting. Alternatively or additionally, this comparison can be based on attributes such as job positions held by the user as compared to the positions for the job postings. In some embodiments, content generation system 100 uses a ranking machine learning model to rank potential job postings and maps attribute data from the most relevant job posting to the prompt inputs. FIG. 12 illustrates another example graphical user interface 1000 in accordance with some embodiments of the present disclosure. Graphical user interface 1000 displays progress indicator 1205 on message body interface 1010 while content generation system generates messaging suggestions (such as suggestion 114 of FIG. 1). For example, in response to the selection of intent option 1110, attribute extraction component 150 extracts attribute data 104 from profile 102. In some embodiments, profile 102 is the profile for the user receiving the message. In some embodiments, profile 102 is the profile for the user sending the message. In still other embodiments, content generation system 100 extracts attribute data 104 from both the profile for the user sending the message and the profile for the user receiving the message. In some examples, the content generation system 100 stores data of messaging metrics associated with attribute data in order to determine the specific type(s) of attribute data that may be prioritized and/or used to generate the message. Prompt generation component 160 generates prompt 106 based on attribute data 104 and the intent option 1110 selected. For example, the user interacting with graphical user interface 1000 to select intent option 1110 to seek work causes instruction generation component 162 to generate instructions for seeking work and input generation component to generate inputs from attribute data 104. Prompt generation component 160 generates message suggestions as described with reference to FIG. 1.

Figure 13:
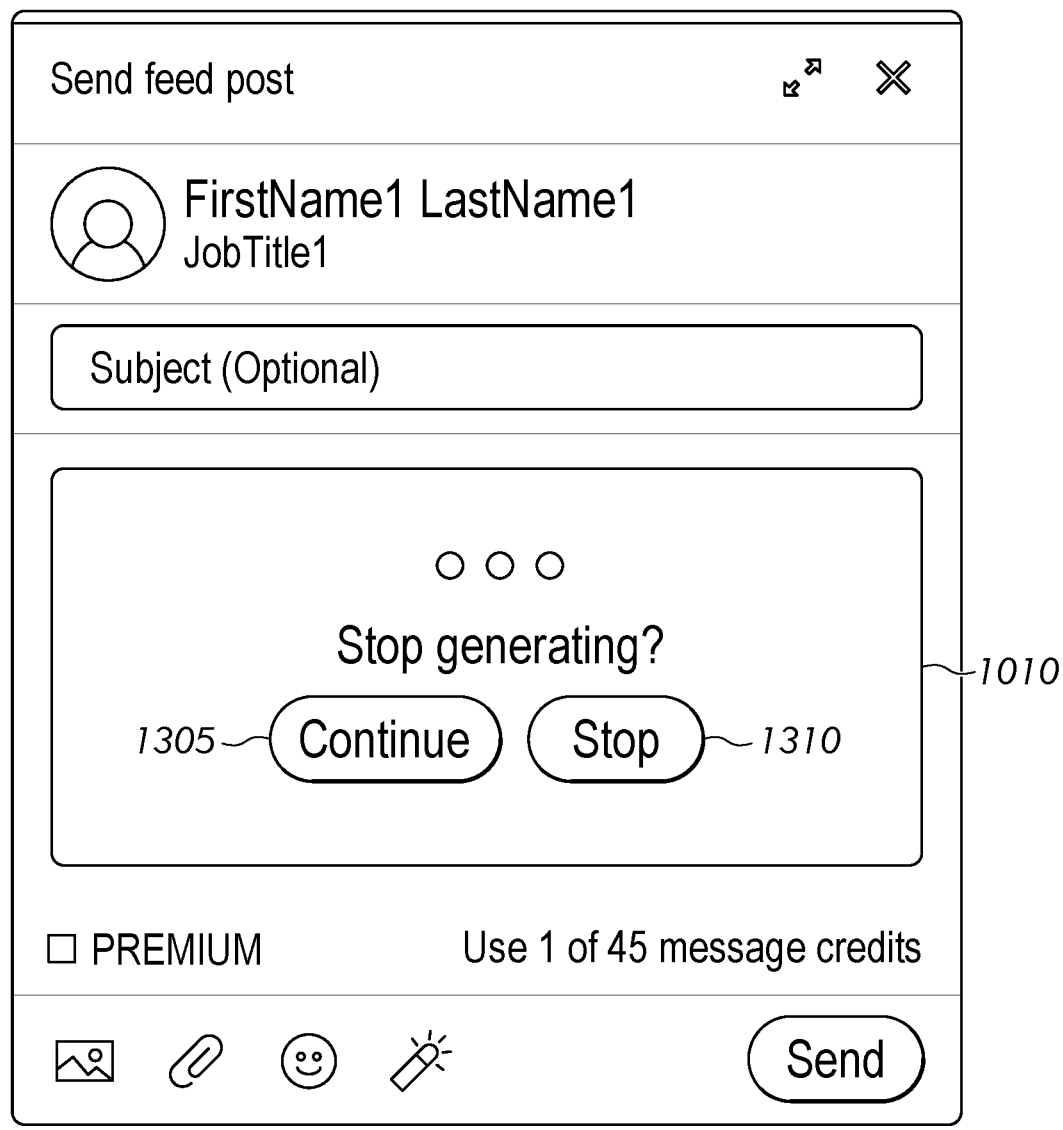
FIG. 13 illustrates another example graphical user interface in accordance with some embodiments of the present disclosure.

FIG. 13 illustrates another example graphical user interface 1000 in accordance with some embodiments of the present disclosure. As shown in FIG. 13, message body interface can also include continue button 1305 and stop button 1310. In response to a user interacting with continue button 1305, content generation system 100 generates prompt 106 using the extracted user attributes and generates message suggestion 114 using prompt 106. In response to a user interacting with stop button 1310, content generation system 100 stops the process and does not generate prompt 106 or message suggestion 114.

Figure 14:
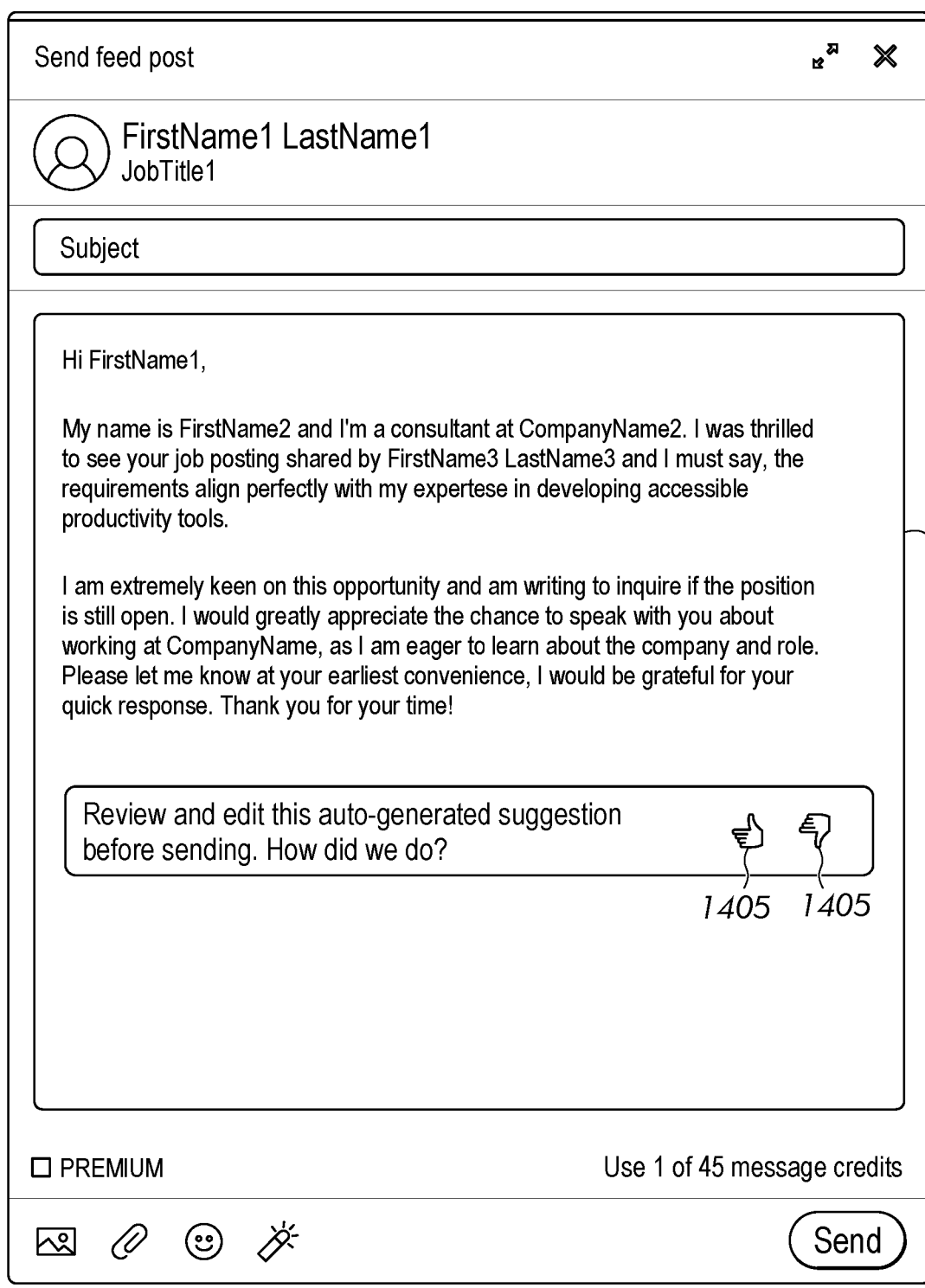
FIG. 14 illustrates another example graphical user interface in accordance with some embodiments of the present disclosure.
Figure 15:
FIG. 15 illustrates another example graphical user interface in accordance with some embodiments of the present disclosure.

FIG. 14 illustrates another example graphical user interface 1000 in accordance with some embodiments of the present disclosure. In response to a user interacting with continue button 1305 and content generation system 100 generating message suggestions, content generation system sends the message suggestions to user system 110 to display on graphical user interface 1000. For example, user system 110 displays the message suggestion in message body interface 1010 along with feedback 1405. In some embodiments, a user interacting with feedback 1405 causes content generation system 100 to receive feedback (such as feedback 116 of FIG. 1). As shown in FIG. 14, feedback 1405 can include positive feedback and negative feedback. Content generation system 100 can regenerate message suggestion 114 displayed in message body interface 1010 in response to receiving a user interaction with negative feedback. Additionally, in response to a user interaction with feedback 1405, graphical user interface 1000 updates to display a feedback screen 1605 as shown in FIGS. 15 and 16.

Figure 16:
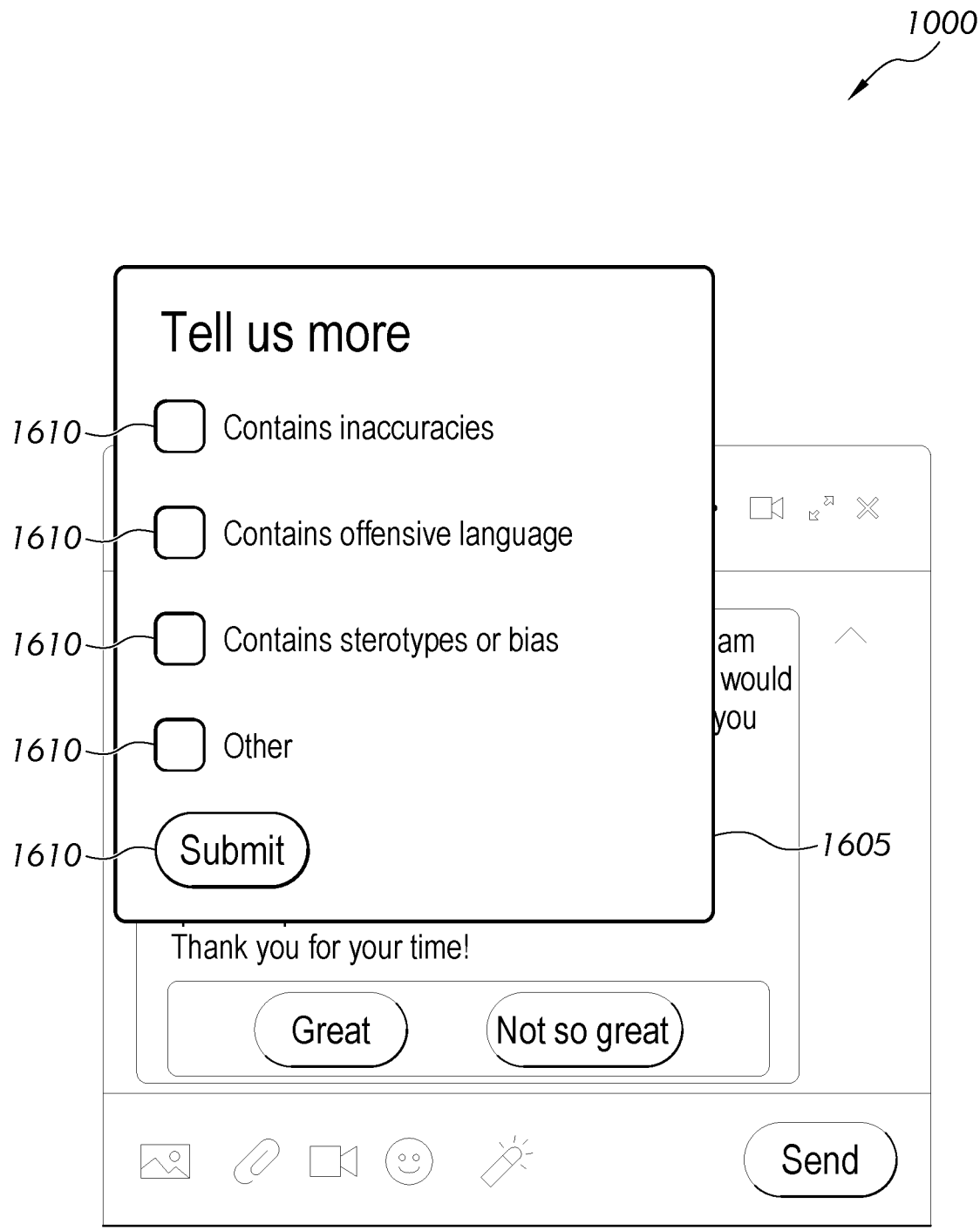
FIG. 16 illustrates another example graphical user interface in accordance with some embodiments of the present disclosure.

FIG. 16 illustrates another example graphical user interface 1000 in accordance with some embodiments of the present disclosure. Feedback screen 1605 includes feedback options 1610. Feedback options 1610 include options for the user to select to determine potential concerns with the message suggestion displayed. In some embodiments, content generation system 100 determines that there is positive feedback in response to a user only selecting done feedback option 1610. In response to a user interacting with done feedback option 1610, graphical user interface updates to display send interface 1705.

In some embodiments, content generation system 100 updates the prompt to change a tone for the suggestion to be displayed. For example, content generation system 100 updates a tone as explained with reference to FIG. 3 in response to a user interaction with feedback 1405 and/or feedback options 1610. In some embodiments, receiving a user interaction with feedback 1405 and/or feedback options 1610 causes the client device (e.g., user system 110) to send feedback (e.g., feedback 116) to a prompt feedback component (e.g., prompt feedback component 168). As explained with reference to FIG. 3, in response to receiving negatively labeled feedback (e.g., feedback 1405 with the thumbs down), content generation system 100 generates an updated prompt through extracting updated attribute data, mapping an updated set of user attributes, generating an updated set of instructions, and/or generating an example.

Figure 17:
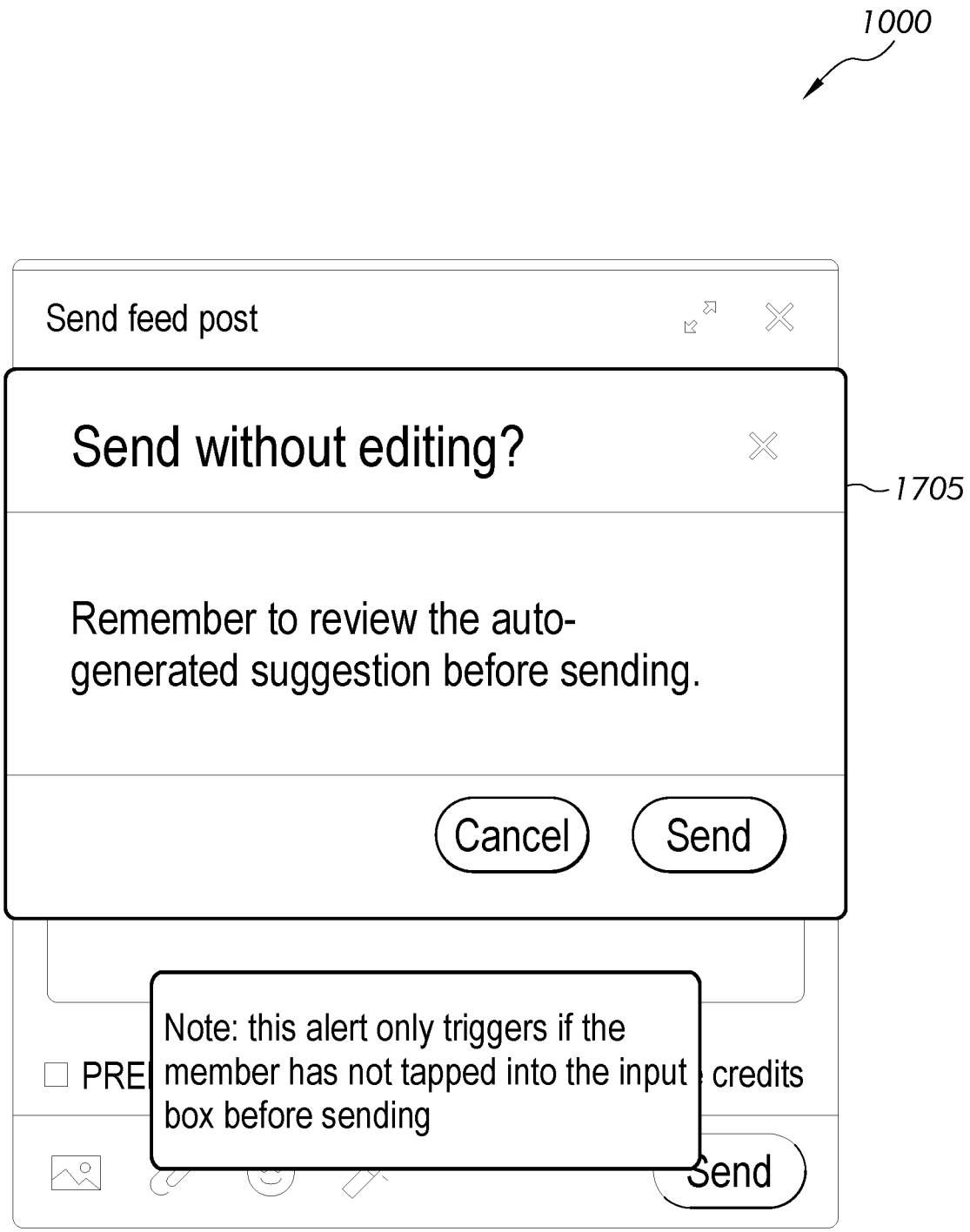
FIG. 17 illustrates another example graphical user interface in accordance with some embodiments of the present disclosure.

FIG. 17 illustrates another example graphical user interface 1000 in accordance with some embodiments of the present disclosure. Send interface 1705 is an interface used to send the message suggestion. For example, a user interacting with the send button in send interface 1705 causes application software system 230 to send the message suggestion to the desired recipient.

Figure 18:
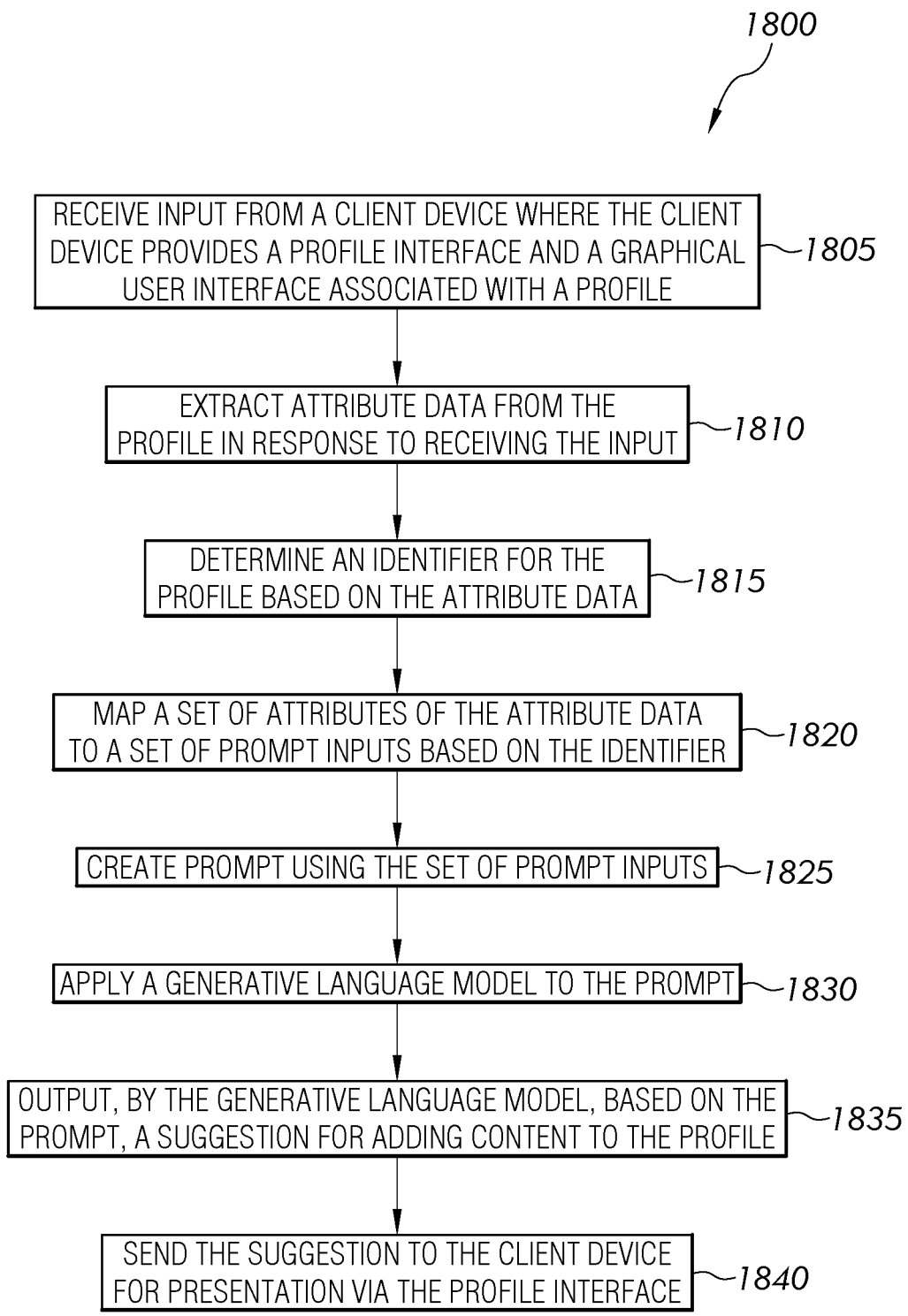
FIG. 18 is a flow diagram of an example method to generate prompts for a generative language model in accordance with some embodiments of the present disclosure.

FIG. 18 is a flow diagram of an example method 1800 to generate prompts for a generative language model in accordance with some embodiments of the present disclosure. The method 1800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1800 is performed by attribute extraction component 150 of FIG. 1. In other embodiments, the method 1800 is performed by prompt generation component 160 of FIG. 1. In still other embodiments, the method 1800 is performed by a combination of attribute extraction component 150 and prompt generation component 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1805, the processing device receives input from a client device where the client device provides a profile interface and a graphical user interface associated with a profile. The input is generated by an interaction with the profile interface. For example, application software system 230 receives input from a user system 110. User system 110 includes user interface 112 implementing a graphical user interface and a profile interface (such as graphical user interface 400 and profile interface 505) and the input is generated in response to an interaction with profile interface 505. Further details with respect to receiving input from a client device are described with reference to FIGS. 1 and 4.

At operation 1810, the processing device extracts attribute data from the profile in response to receiving the input. For example, attribute extraction component 150 extracts attribute data 104 from profile 102. In some embodiments, the processing device extracts the attribute data in response to receiving input from a client device. For example, application software system 230 receives input from a user system 110 including attribute data 104. User system 110 includes user interface 112 implementing a graphical user interface and a profile interface (such as graphical user interface 400 and profile interface 505) and the input is generated in response to an interaction with profile interface 505. Attribute extraction component 150 extracts attribute data from a profile 102 associated with the received input. In some embodiments, attribute extraction component 150 extracts user attribute from profiles other than a profile associated with the received input. For example, attribute extraction component uses a profile similar to the profile associated with the received input and extracts attribute data 104 from the similar profile. Further details with respect to extracting the attribute data are described with reference to FIGS. 1 and 3.

At operation 1815, the processing device determines an identifier for the profile based on the attribute data. For example, prompt generation component 160 determines that profile 102 has an entry level experience identifier based on attribute data 104. In some embodiments, the processing device receives historical activity data for profile 102 and determines the identifier using the historical activity data. For example, prompt generation component 160 determines the identifier based on attribute data 104 indicating that profile 102 is entry level and historical activity data indicating that the user of profile 102 is searching for a job. Further details with respect to determining an identifier are described with reference to FIGS. 1 and 3.

At operation 1820, the processing device maps a set of attributes of the attribute data to a set of prompt inputs based on the identifier. For example, prompt generation component 160 maps a set of user attributes including education to a set of prompt inputs based on the identifier indicating that profile 102 is entry level. In some embodiments, attribute data 104 includes mandatory attributes and optional attributes. For example, attribute data 104 includes an education attribute that is mandatory and an honors attribute that is optional. In some embodiments, the processing device determines the mandatory and optional attributes based on the identifier. For example, education is a mandatory attribute for an entry level profile but an optional attribute for a senior level profile. Further details with respect to mapping the set of user attributes are described with reference to FIGS. 1 and 3.

At operation 1825, the processing device creates a prompt using the set of prompt inputs. For example, prompt generation component 160 creates prompt 106 using the set of mapped prompt inputs. In some embodiments, prompt generation component 160 generates a set of instructions and creates prompt 106 using the set of mapped prompt inputs and the set of instructions. In some embodiments, prompt generation component 160 generates examples and creates prompt 106 using the set of mapped prompt inputs and the examples. In some embodiments, prompt generation component 160 generates a plan of action and created prompt 106 using the set of mapped prompt inputs and the plan of action. Further details with respect to creating a prompt using the set of prompt inputs are described with reference to FIGS. 1 and 3.

At operation 1830, the processing device applies a generative language model to the prompt. For example, prompt generation component 160 inputs prompt 106 into deep learning model 108 to create suggestion 114 as explained with reference to FIG. 1.

At operation 1835, the processing device outputs, based on the prompt, a suggestion for adding content to the profile. For example, deep learning model 108 outputs suggestion 114 based on prompt 106 as explained with reference to FIG. 1.

At operation 1840, the processing device sends a suggestion to the client device for presentation via the profile interface. For example, content generation system 100 sends suggestion 114 to user system 110 causing user system 110 to display suggestion 114 on a graphical user interface 400 of user interface 112. In some embodiments, an application software system such as application software system 230 of FIG. 2 sends suggestion 114 to user system 110. Further details with respect to sending the suggestion to the client device are described with reference to FIGS. 1 and 4-9.

Figure 19:
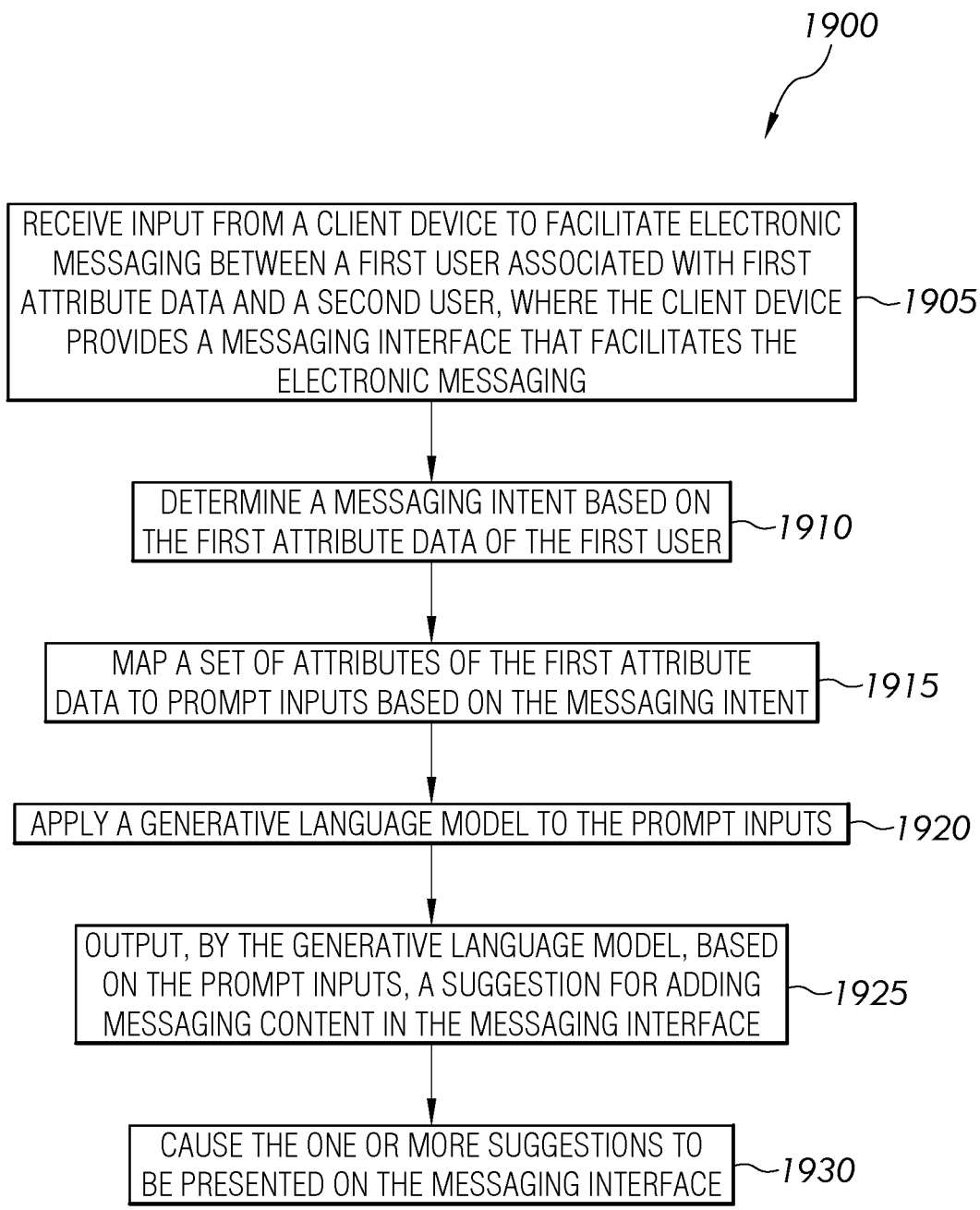
FIG. 19 is a flow diagram of an example method to generate prompts for a generative language model in accordance with some embodiments of the present disclosure.

FIG. 19 is a flow diagram of an example method 1900 to generate prompts for generative language models, in accordance with some embodiments of the present disclosure. The method 1900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1900 is performed by attribute extraction component 150 of FIG. 1. In other embodiments, the method 1900 is performed by prompt generation component 160 of FIG. 1. In still other embodiments, the method 1900 is performed by a combination of attribute extraction component 150 and prompt generation component 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1905, the processing device receives input from a client device to facilitate electronic messaging between a first user associated with first attribute data and a second user. The client device provides a messaging interface that facilitates the electronic messaging. For example, application software system 230 receives input from a user system 110. User system 110 includes user interface 112 implementing a graphical user interface and a messaging interface (such as graphical user interface 1000 and message drafting interface 1105) and the input is generated in response to an interaction with button 1015. Attribute extraction component 150 extracts attribute data 104 from profile 102. In some embodiments, the processing device extracts the attribute data in response to receiving input from a client device. For example, application software system 230 receives input from a user system 110 including attribute data 104. User system 110 includes user interface 112 implementing a graphical user interface and a messaging interface (such as graphical user interface 1000 and message drafting interface 1105) and the input is generated in response to an interaction with button 1015. Attribute extraction component 150 extracts attribute data from a profile 102 associated with the received input. In some embodiments, attribute extraction component 150 extracts user attribute from profiles other than a profile associated with the received input. For example, attribute extraction component 150 uses a profile similar to the profile associated with the received input and extracts attribute data 104 from the similar profile. In some embodiments, attribute extraction component 150 extracts attribute data from a first profile associated with the user initiating the electronic messaging (e.g., message sender) and a second profile associated with a recipient of the electronic messaging. Further details with respect to receiving input from a client device to facilitate electronic messaging between a first user and a second user are described with reference to FIGS. 1 and 3.

At operation 1910, the processing device determines a messaging intent based on the first attribute data of the first user. For example, prompt generation component 160 determines a goal or purpose for the user initiating the electronic messaging. In some embodiments, prompt generation component 160 determines the messaging intent based on historical activity data of the user. For example, prompt generation component 160 determines that the user is seeking work based on recent responses to job postings. In some embodiments, prompt generation component 160 determines the messaging intent based on input received from the client device. For example, prompt generation component 160 determines the messaging intent based on a user selecting a messaging intent from multiple messaging intent options 1110. Further details with respect to determining the messaging intent are described with reference to FIGS. 1 and 11.

At operation 1915, the processing device maps a set of attributes of the attribute data to a set of prompt inputs based on the messaging intent. For example, prompt generation component 160 maps a set of user attributes including attribute data about an inferred job posting to a set of prompt inputs based on the messaging intent indicating that the user is seeking work. In some embodiments, the prompt generation component 160 maps the set of attributes to the set of prompt inputs based on a connection. For example, prompt generation component 160 determines a connection between the message sender and message recipient and maps attributes that are most similar to the prompt inputs. Further details with respect to mapping the set of user attributes are described with reference to FIGS. 1 and 3.

At operation 1920, the processing device applies a generative language model to the prompt inputs. For example, prompt generation component 160 creates prompt 106 using the set of mapped prompt inputs. In some embodiments, prompt generation component 160 generates a set of instructions and creates prompt 106 using the set of mapped prompt inputs and the set of instructions. In some embodiments, prompt generation component 160 generates examples and creates prompt 106 using the set of mapped prompt inputs and the examples. In some embodiments, prompt generation component 160 generates a plan of action and created prompt 106 using the set of mapped prompt inputs and the plan of action. Prompt generation component 160 inputs prompt 106 into deep learning model 108 to create suggestion 114 as explained with reference to FIG. 1.

At operation 1925, the processing device outputs, by the generative language model, suggestions for adding content to the messaging interface. For example, deep learning model 108 outputs suggestion 114 based on prompt 106 as explained with reference to FIG. 1.

At operation 1930, the processing device causes the suggestion to be presented on the messaging interface. For example, content generation system 100 sends suggestion 114 to user system 110 causing user system 110 to display suggestion 114 on a graphical user interface 1000 of user interface 112. In some embodiments, an application software system such as application software system 230 of FIG. 2 sends suggestion 114 to user system 110. Further details with respect to sending the suggestion to the client device are described with reference to FIGS. 1 and 4-9.

Figure 20:
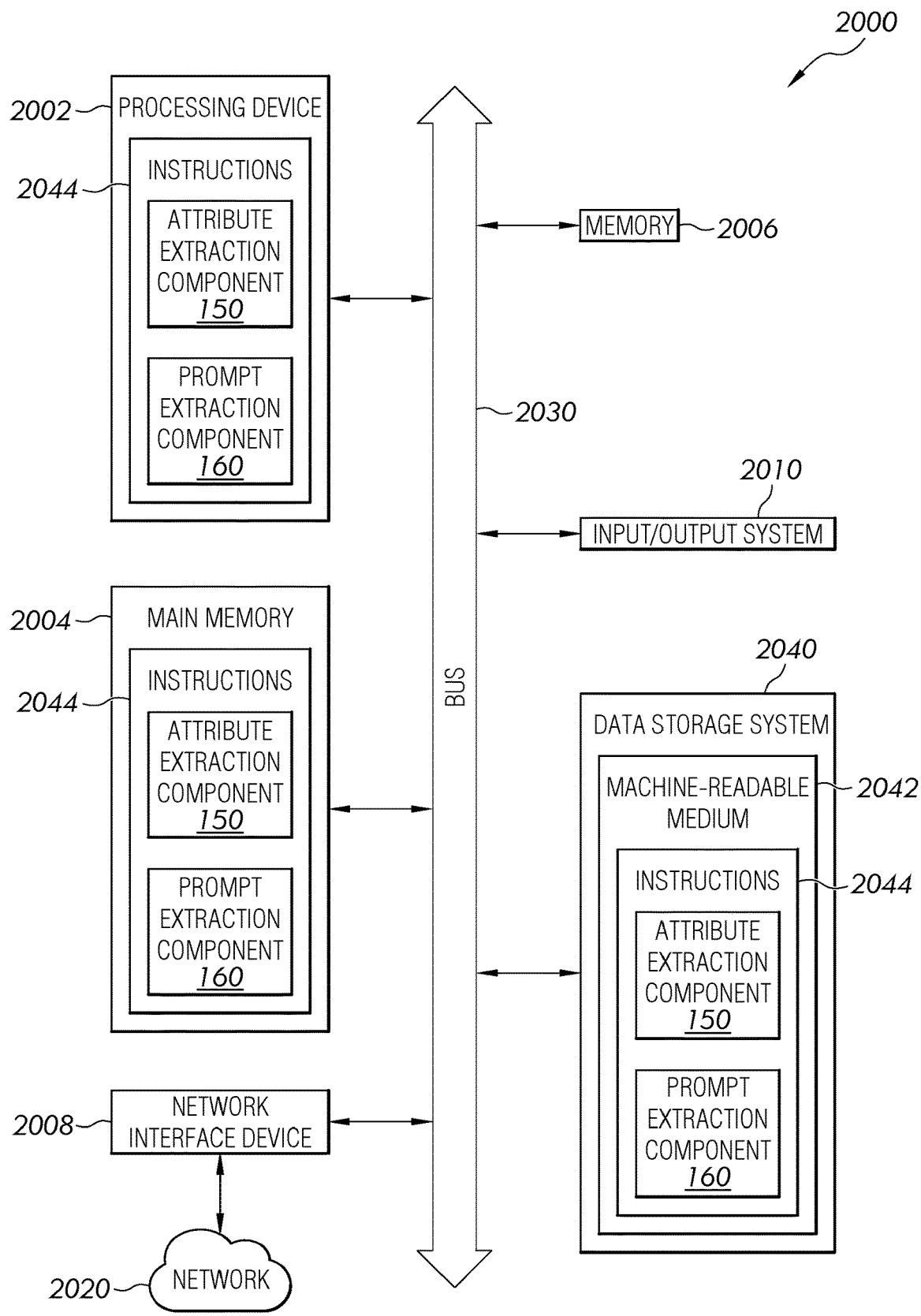
FIG. 20 is a block diagram of an example computer system in which embodiments of the present disclosure can operate.

FIG. 20 illustrates an example machine of a computer system 2000 within which a set of instructions, for causing the machine to perform any one or more of the methodologies discussed herein, can be executed. In some embodiments, the computer system 2000 can correspond to a component of a networked computer system (e.g., the computer system 100 of FIG. 1) that includes, is coupled to, or utilizes a machine to execute an operating system to perform operations corresponding to attribute extraction component 150 and/or prompt generation component 160 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 2000 includes a processing device 2002, a main memory 2004 (e.g., read-only memory (ROM), flash memory, dynamic random-access memory (DRAM) such as synchronous DRAM (SDRAM) or Rambus DRAM (RDRAM), etc.), a memory 2006 (e.g., flash memory, static random-access memory (SRAM), etc.), an input/output system 2010, and a data storage system 2040, which communicate with each other via a bus 2030.

Processing device 2002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 2002 can also be one or more special-purpose processing devices such as an application specific integrated circuit (ASIC), a field programmable gate array (FPGA), a digital signal processor (DSP), network processor, or the like. The processing device 2002 is configured to execute instructions 2044 for performing the operations and steps discussed herein.

The computer system 2000 can further include a network interface device 2008 to communicate over the network 2020. Network interface device 2008 can provide a two-way data communication coupling to a network. For example, network interface device 2008 can be an integrated-services digital network (ISDN) card, cable modem, satellite modem, or a modem to provide a data communication connection to a corresponding type of telephone line. As another example, network interface device 2008 can be a local area network (LAN) card to provide a data communication connection to a compatible LAN. Wireless links can also be implemented. In any such implementation network interface device 2008 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 2000.

Computer system 2000 can send messages and receive data, including program code, through the network(s) and network interface device 2008. In the Internet example, a server can transmit a requested code for an application program through the Internet and network interface device 2008. The received code can be executed by processing device 2002 as it is received, and/or stored in data storage system 2040, or other non-volatile storage for later execution.

The input/output system 2010 can include an output device, such as a display, for example a liquid crystal display (LCD) or a touchscreen display, for displaying information to a computer user, or a speaker, a haptic device, or another form of output device. The input/output system 2010 can include an input device, for example, alphanumeric keys and other keys configured for communicating information and command selections to processing device 2002. An input device can, alternatively or in addition, include a cursor control, such as a mouse, a trackball, or cursor direction keys for communicating direction information and command selections to processing device 2002 and for controlling cursor movement on a display. An input device can, alternatively or in addition, include a microphone, a sensor, or an array of sensors, for communicating sensed information to processing device 2002. Sensed information can include voice commands, audio signals, geographic location information, and/or digital imagery, for example.

The data storage system 2040 can include a machine-readable storage medium 2042 (also known as a computer-readable medium) on which is stored one or more sets of instructions 2044 or software embodying any one or more of the methodologies or functions described herein. The instructions 2044 can also reside, completely or at least partially, within the main memory 2004 and/or within the processing device 2002 during execution thereof by the computer system 2000, the main memory 2004 and the processing device 2002 also constituting machine-readable storage media.

In one embodiment, the instructions 2044 include instructions to implement functionality corresponding to an attribute extraction component and a prompt generation component (e.g., attribute extraction component 150 and prompt generation component 160 of FIG. 1). While the machine-readable storage medium 2042 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods 1800 and 1900 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

An example 1 includes a method including: receiving input from a client device providing (i) a graphical user interface (GUI) associated with a profile and (ii) a profile interface, where the input is generated by an interaction with the profile interface; extracting attribute data from the profile in response to receiving the input; determining an identifier for the profile based on the attribute data; mapping a set of attributes of the attribute data to a set of prompt inputs based on the identifier; creating one or more prompts using the set of prompt inputs; applying a generative language model to the one or more prompts; outputting, by the generative language model, based on the one or more prompts, one or more suggestions for adding content to the profile; and sending the one or more suggestions to the client device for presentation via the profile interface. An example 2 includes the subject matter of example 1, further including: receiving historical activity data for the profile, where determining the identifier further uses the historical activity data. An example 3 includes the subject matter of any of examples 1 and 2, further including: in response to receiving the input, sending a plurality of profile section update options to the client device for presentation via the profile interface; and receiving, from the client device, a profile section update selection of the plurality of profile section update options based on an interaction with the profile interface. An example 4 includes the subject matter of example 3, where sending the one or more suggestions includes: sending the one more suggestions to the client device for presentation via a section of the profile interface based on the profile section update selection. An example 5 includes the subject matter of example 3, further including: generating a performance parameter based on the one or more suggestions. An example 6 includes the subject matter of example 5, where generating the performance parameter includes: receiving, from the client device, feedback on the one or more suggestions. An example 7 includes the subject matter of any of examples 5 and 6, further including: training a machine learning model using the set of prompt inputs and the performance parameter; and generating an updated set of prompt inputs using the trained machine learning model. An example 8 includes the subject matter of any of examples 5-7, further including: mapping an updated set of attributes of the attribute data to the set of prompt inputs based on the performance parameter; and creating one or more updated prompts using the set of prompt inputs. An example 9 includes the subject matter of any of examples 5-8, further including: in response to the performance parameter satisfying a threshold, generating one or more suggestion examples based on the set of attributes and the profile section update selection, where creating the one or more prompts further uses the one or more suggestion examples. An example 10 includes the subject matter of example 9, further including: creating a training set using the set of attributes and a set of examples; and applying the training set to a suggestion example machine learning model, where generating the one or more suggestion examples uses an output of the suggestion example machine learning model. An example 11 includes the subject matter of any of examples 5-10, further including: applying an inference machine learning model to the one or more suggestions, where generating the performance parameter is based on an output of the inference machine learning model. An example 12 includes the subject matter of any of examples 1-11, where the attribute data includes a set of mandatory attributes and a set of optional attributes, the method further including: determining the set of mandatory attributes and the set of optional attributes based on the identifier, where mapping the set of attributes to the set of prompt inputs includes mapping the set of mandatory attributes and the set of optional attributes to the set of prompt inputs. An example 13 includes the subject matter of any of examples 1-12, where the client device provides the profile interface displayed concurrently with the profile, and the profile interface is distinct from the GUI.

An example 14 includes a system including: at least one memory device; and at least one processing device, operatively coupled with the at least one memory device, to:

receive input from a client device providing (i) a graphical user interface (GUI) associated with a profile and (ii) a profile interface, where the input is generated by an interaction with the profile interface; extract attribute data from the profile in response to receiving the input; determine an identifier for the profile based on the attribute data; map a set of attributes of the attribute data to a set of prompt inputs based on the identifier; create one or more prompts using the set of prompt inputs; apply a generative language model to the one or more prompts; output, by the generative language model, based on the one or more prompts, one or more suggestions for adding content to the profile; and send the one or more suggestions to the client device for presentation via the profile interface. An example 15 includes the subject matter of example 14, where the at least one processing device further: receives historical activity data for the profile, where determining the identifier further uses the historical activity data. An example 16 includes the subject matter of any of examples 14 and 15, where the processing device further: in response to receiving the input, sends a plurality of profile section update options to the client device for presentation via the profile interface; and receives, from the client device, a profile section update selection of the plurality of profile section update options based on an interaction with the profile interface. An example 17 includes the subject matter of example 16, where sending the one or more suggestions includes: sending the one more suggestions to the client device for presentation via a section of the profile interface based on the profile section update selection.

An example 18 includes at least one non-transitory computer-readable storage medium including at least one instruction that, when executed by at least one processing device, causes the at least one processing device to: receive input from a client device providing (i) a graphical user interface (GUI) associated with a profile and (ii) a profile interface, where the input is generated by an interaction with the profile interface; extract attribute data from the profile in response to receiving the input; determine an identifier for the profile based on the attribute data; map a set of attributes of the attribute data to a set of prompt inputs based on the identifier; create one or more prompts using the set of prompt inputs; apply a generative language model to the one or more prompts; output, by the generative language model, based on the one or more prompts, one or more suggestions for adding content to the profile; and send the one or more suggestions to the client device for presentation via the profile interface. An example 19 includes the subject matter of example 18, where the at least one processing device further: receives historical activity data for the profile, where determining the identifier further uses the historical activity data. An example 20 includes the subject matter of any of examples 18 and 19, where the at least one processing device further: in response to receiving the input, sends a plurality of profile section update options to the client device for presentation via the profile interface; and receives, from the client device, a profile section update selection of the plurality of profile section update options based on an interaction with the profile interface.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving input via a client device comprising (i) a graphical user interface (GUI) associated with a profile and (ii) a profile interface, wherein the input is generated by an interaction with the profile interface;
extracting attribute data from the profile in response to receiving the input;
determining an identifier for the profile based on the attribute data, wherein the identifier comprises a characteristic of a user associated with the input;
determining a subset of attributes of the attribute data using the identifier;
determining an optional attribute for the user based on the characteristic of the user;
based on the input, including the optional attribute in the subset of attributes or excluding the optional attribute from the subset of attributes;
mapping the subset of attributes to a set of prompt inputs;
creating a prompt using the set of prompt inputs mapped to the subset of attributes, wherein the prompt comprises an instruction to a generative machine learning model to cause the generative machine learning model to generate a suggestion for adding content to the profile using the subset of attributes;
applying the generative machine learning model to the prompt;
outputting, by the generative machine learning model, based on the prompt, the suggestion; and
sending the suggestion to the client device for presentation via the profile interface.

2. The method of claim 1, further comprising:
receiving historical activity data for the profile, wherein determining the identifier is further based on the historical activity data.

3. The method of claim 1, further comprising:
in response to receiving the input, sending a plurality of profile section update options to the client device for presentation via the profile interface; and
receiving, from the client device, a profile section update selection of the plurality of profile section update options based on an interaction with the profile interface.

4. The method of claim 3, wherein sending the suggestion comprises:
sending the suggestion to the client device for presentation via a section of the profile interface based on the profile section update selection.

5. The method of claim 3, further comprising:
generating a performance parameter based on the suggestion.

6. The method of claim 5, wherein generating the performance parameter comprises:
receiving, from the client device, feedback on the suggestion.

7. The method of claim 5, further comprising:
training a machine learning model using the set of prompt inputs and the performance parameter; and
generating an updated set of prompt inputs using the trained machine learning model.

8. The method of claim 5, further comprising:
mapping an updated subset of attributes of the attribute data to the set of prompt inputs based on the performance parameter; and
creating an updated prompt using the set of prompt inputs mapped to the updated subset of attributes.

9. The method of claim 5, further comprising:
in response to the performance parameter satisfying a threshold, generating a suggestion example based on the subset of attributes and the profile section update selection, wherein creating the prompt further uses the suggestion example.

10. The method of claim 9, further comprising:
creating a training set using the subset of attributes and a set of examples; and
applying the training set to a suggestion example machine learning model, wherein generating the suggestion example uses an output of the suggestion example machine learning model.

11. The method of claim 5, further comprising:
applying an inference machine learning model to the suggestion, wherein generating the performance parameter is based on an output of the inference machine learning model.

12. The method of claim 1, wherein the attribute data comprises a set of mandatory attributes and a set of optional attributes,
and wherein mapping the subset of attributes to the set of prompt inputs comprises mapping the set of mandatory attributes and the set of optional attributes to the set of prompt inputs.

13. The method of claim 1, wherein the client device provides the profile interface displayed concurrently with the profile, and the profile interface is distinct from the GUI.

14. A system comprising:
at least one memory device; and
at least one processing device, operatively coupled with the at least one memory device, to:
receive input via a client device comprising (i) a graphical user interface (GUI) associated with a profile and (ii) a profile interface, wherein the input is generated by an interaction with the profile interface;
extract attribute data from the profile in response to receiving the input;
determine an identifier for the profile based on the attribute data, wherein the identifier comprises a characteristic of a user associated with the input;
determine a subset of attributes of the attribute data using the identifier;
determine an optional attribute for the user based on the characteristic of the user;
include or exclude the optional attribute from the subset of attributes based on the input;
map the subset of attributes to a set of prompt inputs;
create a prompt using the set of prompt inputs mapped to the subset of attributes, wherein the prompt comprises an instruction to a generative machine learning model to cause the generative machine learning model to generate a suggestion for adding content to the profile using the subset of attributes;
apply the generative machine learning model to the prompt;
output, by the generative machine learning model, based on the prompt, the suggestion; and
send the suggestion to the client device for presentation via the profile interface.

15. The system of claim 14, wherein the at least one processing device further:
receives historical activity data for the profile, wherein determining the identifier is further based on the historical activity data.

16. The system of claim 14, wherein the at least one processing device further:
in response to receiving the input, sends a plurality of profile section update options to the client device for presentation via the profile interface; and
receives, from the client device, a profile section update selection of the plurality of profile section update options based on an interaction with the profile interface.

17. The system of claim 16, wherein sending the suggestion comprises:
sending the suggestion to the client device for presentation via a section of the profile interface based on the profile section update selection.

18. At least one non-transitory computer-readable storage medium comprising at least one instruction that, when executed by at least one processing device, causes the at least one processing device to:
receive input via a client device comprising (i) a graphical user interface (GUI) associated with a profile and (ii) a profile interface, wherein the input is generated by an interaction with the profile interface;
extract attribute data from the profile in response to receiving the input;
determine an identifier for the profile based on the attribute data, wherein the identifier comprises a characteristic of a user associated with the input;
determine a subset of attributes of the attribute data using the identifier;
determine that an attribute of the attribute data is an optional attribute for the user based on the characteristic of the user;
based on the input, include the optional attribute in the subset of attributes or exclude the optional attribute from the subset of attributes;
map the subset of attributes to a set of prompt inputs;
create a prompt using the set of prompt inputs mapped to the subset of attributes, wherein the prompt comprises an instruction to a generative machine learning model to cause the generative machine learning model to generate a suggestion for adding content to the profile using the subset of attributes;
apply the generative machine learning model to the prompt;
output, by the generative machine learning model, based on the prompt, the suggestion; and
send the suggestion to the client device for presentation via the profile interface.

19. The at least one non-transitory computer-readable storage medium of claim 18, wherein the at least one processing device further:
receives historical activity data for the profile, wherein determining the identifier further uses the historical activity data.

20. The at least one non-transitory computer-readable storage medium of claim 18, wherein the at least one processing device further:
in response to receiving the input, sends a plurality of profile section update options to the client device for presentation via the profile interface; and
receives, from the client device, a profile section update selection of the plurality of profile section update options based on an interaction with the profile interface.

* * * * *